(12) United States Patent
Kancharla

(10) Patent No.: US 11,675,335 B2
(45) Date of Patent: Jun. 13, 2023

(54) ROBOTIC SYSTEMS AND METHODS TO TREAT VERTICAL EXTERNAL SURFACE OF STRUCTURE

(71) Applicant: ARoboticsCompany, Inc., Ossining, NY (US)

(72) Inventor: Akaash Reddy Kancharla, Armonk, NY (US)

(73) Assignee: AROBOTICSCOMPANY INC., Ossining, NY (US)

( * ) Notice: Subject to any disclaimer, the term of this patent is extended or adjusted under 35 U.S.C. 154(b) by 356 days.

(21) Appl. No.: 16/913,145

(22) Filed: Jun. 26, 2020

(65) Prior Publication Data
US 2021/0405615 A1    Dec. 30, 2021

(51) Int. Cl.
| | | |
|---|---|---|
| *E04G 23/00* | (2006.01) | |
| *G05B 19/4155* | (2006.01) | |
| *B25J 5/04* | (2006.01) | |
| *A47L 1/02* | (2006.01) | |
| *B25J 11/00* | (2006.01) | |

(52) U.S. Cl.
CPC ............ *G05B 19/4155* (2013.01); *A47L 1/02* (2013.01); *B25J 5/04* (2013.01); *B25J 11/0065* (2013.01); *B25J 11/0075* (2013.01); *B25J 11/0085* (2013.01); *G05B 2219/40269* (2013.01); *G05B 2219/45078* (2013.01)

(58) Field of Classification Search
CPC .. A47L 1/02; A47L 11/00; A47L 11/38; A47L 2201/00; E04G 23/002; E04G 23/004
See application file for complete search history.

(56) References Cited

U.S. PATENT DOCUMENTS

| | | |
|---|---|---|
| 4,993,913 A | 2/1991 | Ohtsuki |
| 5,240,503 A | 8/1993 | Levy et al. |
| 9,784,001 B1 * | 10/2017 | Apostolopoulos ........ E04G 7/04 |

(Continued)

FOREIGN PATENT DOCUMENTS

| | | |
|---|---|---|
| WO | 2019155473 A | 8/2019 |
| WO | 2019155473 A1 | 8/2019 |

OTHER PUBLICATIONS

PCT International Search Report and Written Opinion for PCT Application No. PCT/US21/038631, dated Sep. 24, 2021, 9 pp.

*Primary Examiner* — David G Cormier
(74) *Attorney, Agent, or Firm* — Buckley, Maschoff L & Talwalkar LLC

(57) ABSTRACT

A frame body may be parallel to and proximate with an external surface of a structure and extend substantially horizontally from a first side to a second side. A connecting portion may be provided to be attached to a cable to provide for vertical movement of the frame body. A robotic arm may be affixed proximate to a bottom of the frame body and be able to move horizontally during treatment of the external surface. Moreover, the robotic arm may extend to an end proximate with the external surface, and a cleaning portion may be attached to the robotic arm near the end proximate with the external surface. The robotic arm may rotate, vertically moving the cleaning portion during treatment of the external surface. In addition, the cleaning portion may be separately rotated to remain substantially parallel to and proximate with the external surface during rotation of the robotic arm.

23 Claims, 36 Drawing Sheets

(56) References Cited

U.S. PATENT DOCUMENTS

| | | |
|---|---|---|
| 2003/0106176 A1 | 6/2003 | Wang |
| 2008/0295265 A1 | 4/2008 | Gorman |
| 2017/0007336 A1* | 1/2017 | Tsuboi .................. B25J 9/1674 |
| 2018/0055299 A1 | 3/2018 | Blake et al. |
| 2021/0180351 A1* | 6/2021 | Lau ........................ B25J 9/0084 |

* cited by examiner

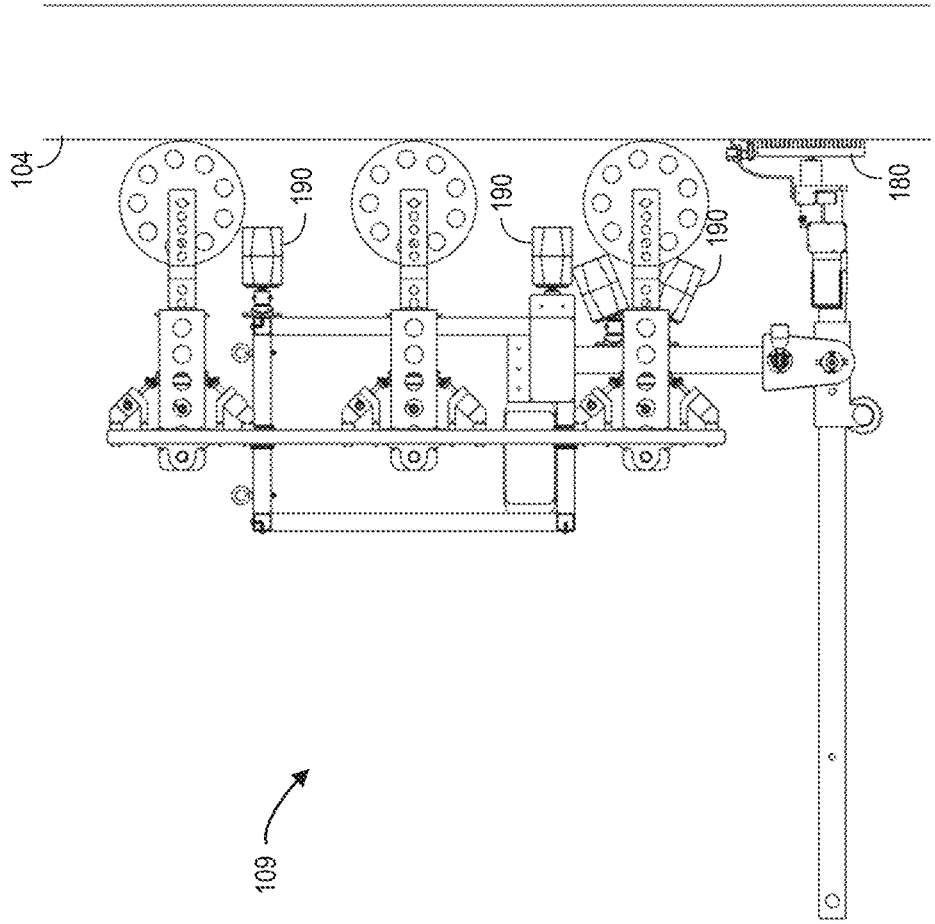

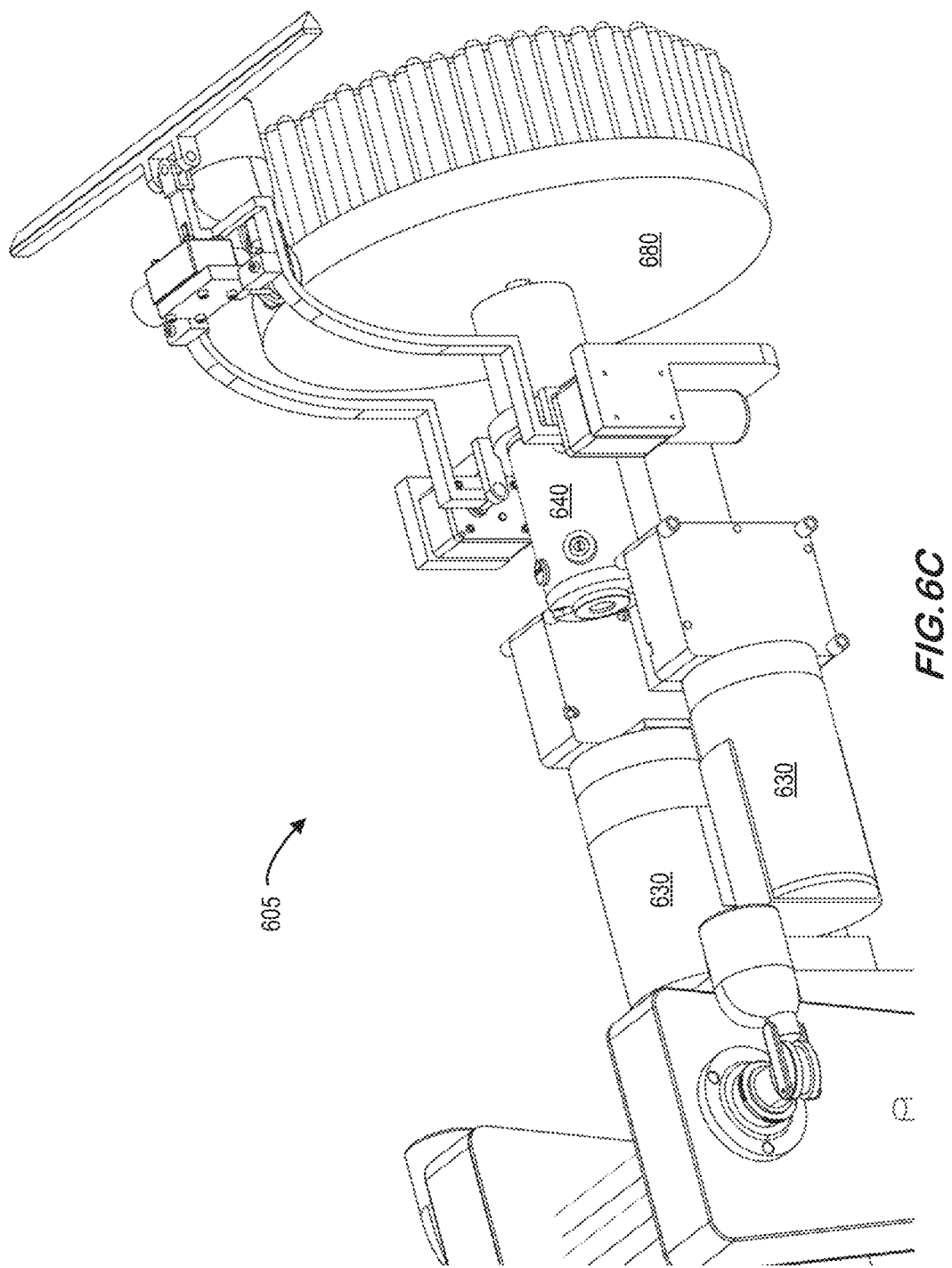

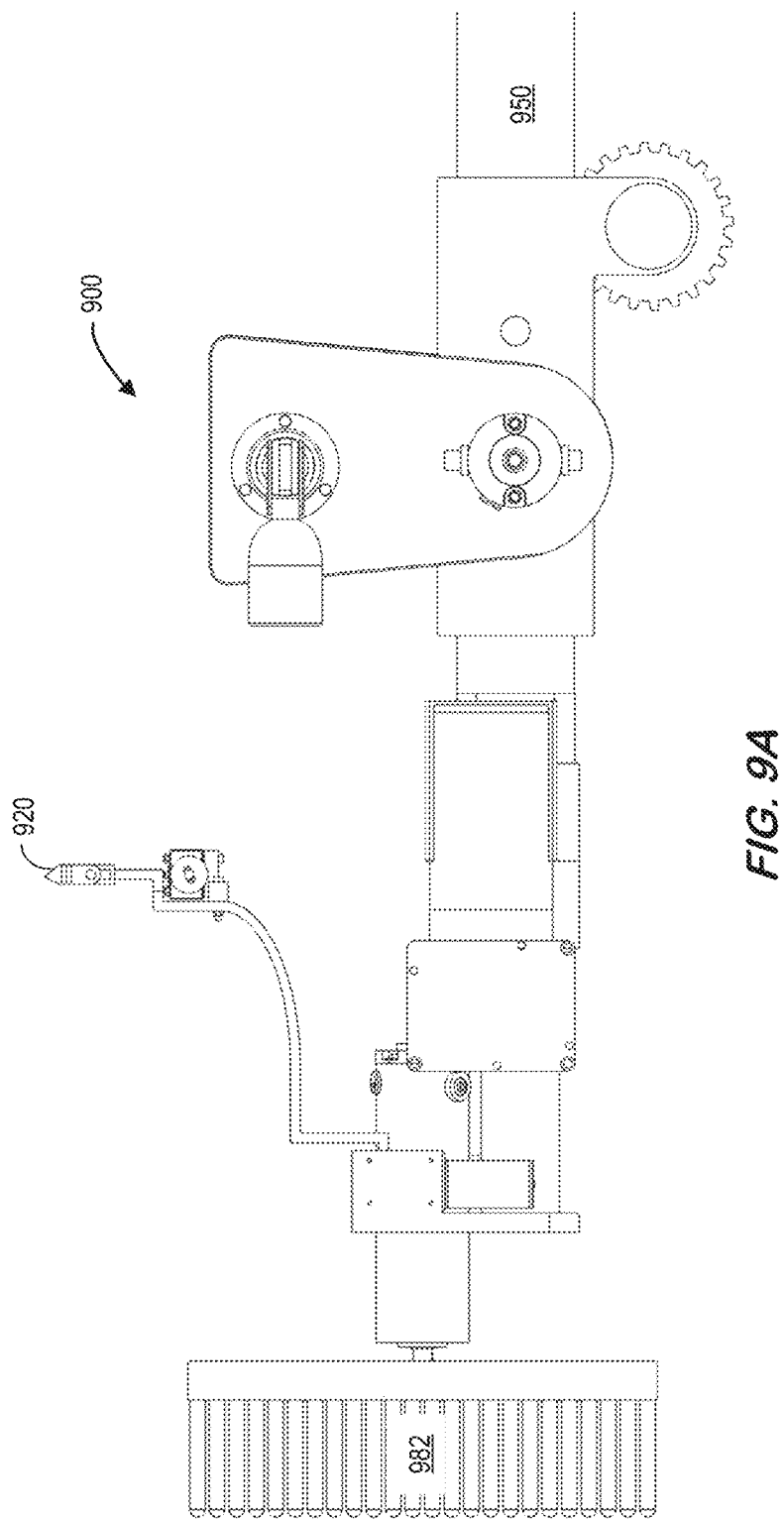

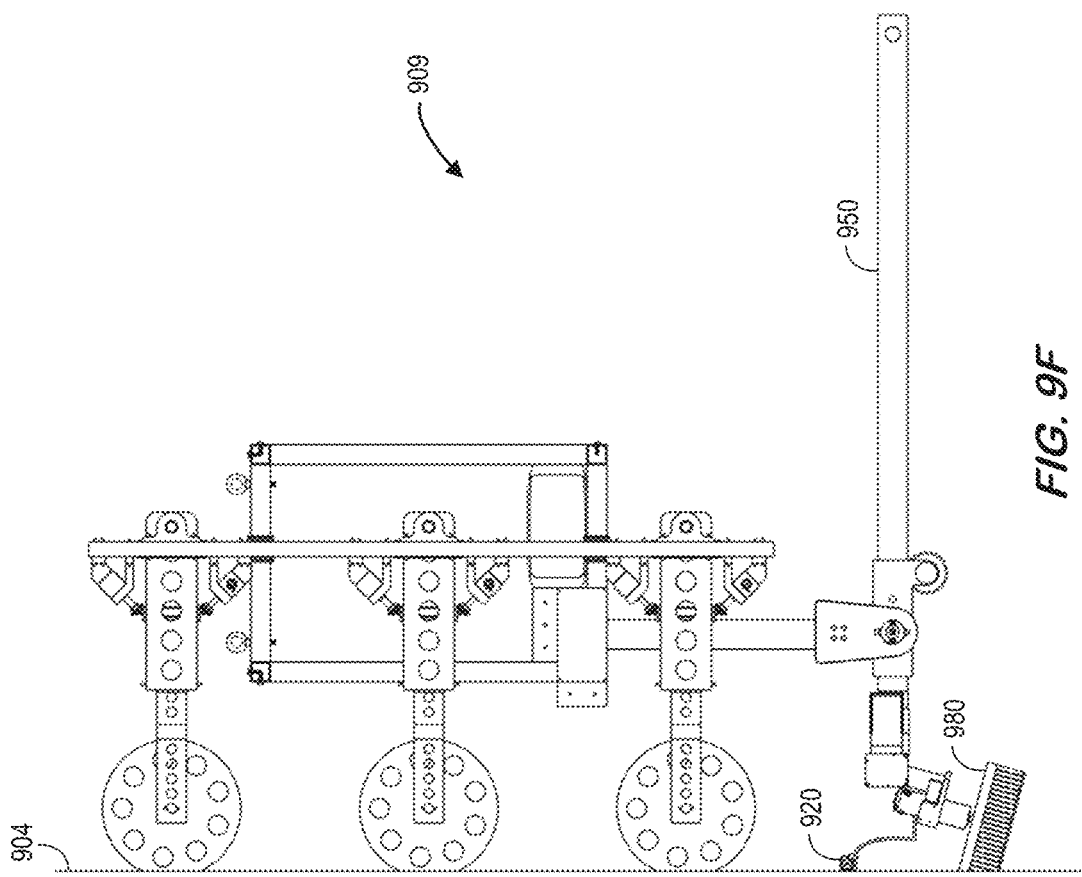

| SURFACE TREATMENT SYSTEM IDENTIFIER 1502 | BUILDING IDENTIFIER 1504 | DATE (TIME) 1506 | OPERATOR IDENTIFIER 1508 | RECORDED MOVEMENTS 1510 |
|---|---|---|---|---|
| STS_10001 | B_101 | 7/15/2024 (14:45.40) | O_101 | |
| STS_10001 | B_101 | 7/16/2024 (13:02.28) | O_102 | |
| STS_10003 | B_102 | 7/18/2024 (08:28.32) | O_101 | |

ROBOTIC SYSTEMS AND METHODS TO TREAT VERTICAL EXTERNAL SURFACE OF STRUCTURE

TECHNICAL FIELD

Some embodiments are directed to treatment of external surfaces of a structure. In particular, embodiments disclose robotic systems and methods to treat substantially vertical external surfaces of a structure.

BACKGROUND

The external surfaces of any man-made structure will need periodic treatment. For example, the vertical external walls of a multi-story office building (e.g., including windows) may need to be periodically cleaned or washed to remove dust and particles left by pollution or other sources. Similarly, other surface treatments may be needed, for example: polyurethane coating or painting; metal surfaces may need to be polished or treated to prevent rusting, etc. Typically, a human exterior maintenance operator will use a harness and/or a movable scaffold (e.g., a suspended cradle attached to cables, also referred to as a Building Maintenance Unit ("BMU") or gondola) to manually apply a brush, sponge, and/or wiper blade (e.g., a squeegee) or other tools to clean and/or treat the surface. Such an approach, however, may be associated with substantial risk as the human worker may be injured (or killed) and human error may result in property damage and/or delays. Such risks may increase because the work is physically difficult, and the judgement of a tired worker may become impaired. Moreover, a human window washer will have limited physical capabilities (e.g., reach) and may be unable to work in even mildly difficult weather (e.g., wind, rain, fog, snow, etc.).

In some cases, robotic arms refitted to standard window washing platforms may be employed. This approach, however, may be unable to handle complex building surfaces (e.g., with angled recesses, ledges, etc.). Moreover, most approaches are limited to applying a single type of treatment (e.g., cleaning or polishing). A need, therefore, exists for improved systems and methods to treat substantially vertical external surfaces of structures.

SUMMARY

According to some embodiments, a frame body may be parallel to and proximate with an external surface of a structure and extend substantially horizontally from a first side to a second side. A connecting portion may be provided to be attached to a cable to provide for vertical movement of the frame body. A robotic arm may be affixed proximate to a bottom of the frame body and be able to move horizontally during treatment of the external surface. Moreover, the robotic arm may extend to an end proximate with the external surface, and a cleaning portion may be attached to the robotic arm near the end proximate with the external surface. The robotic arm may rotate, vertically moving the cleaning portion during treatment of the external surface. In addition, the cleaning portion may be separately rotated to remain substantially parallel to and proximate with the external surface during rotation of the robotic arm.

Some embodiments comprise: means for placing a surface treatment system proximate to the external surface, the surface treatment system having a frame body parallel to and proximate with the external surface and extending substantially horizontally from a first side to a second side; means for moving the surface treatment system vertically via at least one connecting portion adapted to be attached to a cable; means for moving a robotic arm, movably affixed proximate to the frame body, horizontally along the frame body; and means for treating the external surface with a treating portion attached to the robotic arm at an end proximate with the external surface, wherein the robotic arm is adapted to rotate, vertically moving the treating portion during treatment of the external surface, and further wherein the treating portion is separately rotated to remain substantially parallel to and proximate with the external surface during rotation of the robotic arm.

Some technical advantages of some embodiments disclosed herein are improved systems and methods to treat substantially vertical external surfaces of a structure.

BRIEF DESCRIPTION OF THE DRAWINGS

FIGS. 1A through 1D show a surface treatment system according to some embodiments.

FIGS. 6A through 6D are more detailed views of a robotic arm in accordance with some embodiments.

FIGS. 9A through 9G illustrate wiper blade engagement according to some embodiments.

FIG. 15 is a surface treatment database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention relates to a new and useful robotic system to treat an external surface of a "structure," such as a skyscraper. As used herein, the term "structure" might refer to a building, a multi-story building, an office building, a warehouse, a stadium, a wall, a bridge, a monument, a dam, an apartment building, an airport structure (e.g., a control tower), a man-made structure with at least 10,000 square feet of exterior surfaces, etc. Moreover, the phrase "external surface" might be associated with a wall, a window, brick, stone, steel, concrete, cement, iron and alloys, terracotta, metal, etc.

Figure 1A:
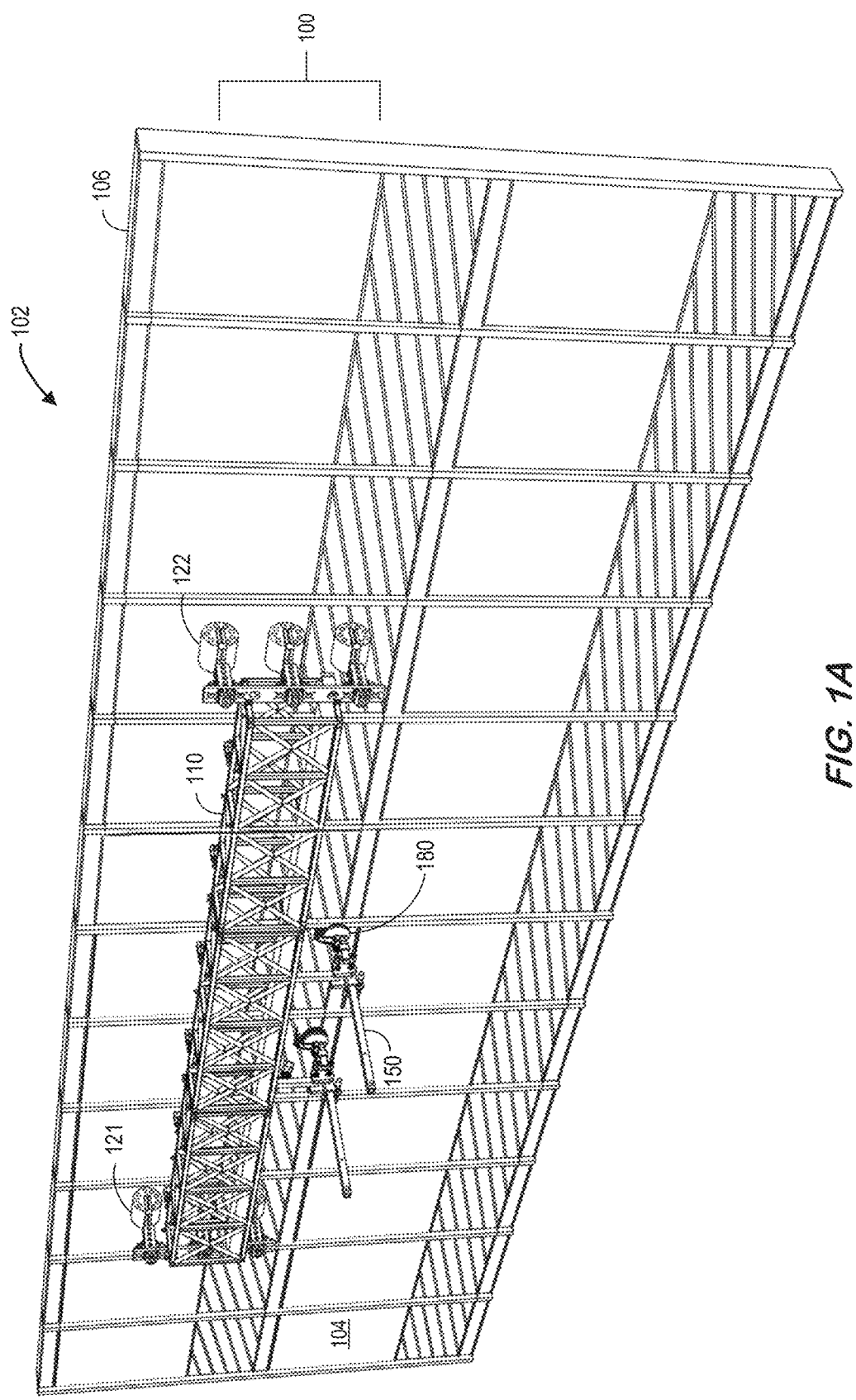

FIG. 1A illustrates 102 an external surface 104 (e.g., a wall) of a structure 106 (e.g., a multi-story office building). As shown, a surface treatment system 100 may include a frame body 110 according to some embodiments. The frame body 110 may be parallel to and proximate with the external surface 110 and extend substantially horizontally from a first side to a second side. A robotic arm 150 may be movably affixed to the frame body 110 (e.g., near the bottom of the frame body 110) and able to move horizontally along the frame body 110 during treatment of the external surface 104. The robotic arm 150 may extend to an end proximate with the external surface 104 and a treating portion 180 (e.g., a brush, sponge, nozzle, etc.) may be attached to the robotic arm 150 near the end proximate with the external surface 104. According to some embodiments, the robotic arm 150 is adapted to rotate, vertically moving the treating portion 180 during treatment of the external surface 104. Moreover, the treating portion 180 may be separately rotated to remain substantially parallel to and proximate with the external surface 104 during rotation of the robotic arm 150 (e.g., as described with respect to FIGS. 5A and 5B). In some embodiments, a first set of buffer portions 121 may be located proximate to a first side to move vertically on the external surface 104, and a second set of buffer portions 122 may be located proximate to a second side to move vertically on the external surface 104. Note that more than two sets of buffer portions 121, 122 may be employed. The first and second sets of buffer portions 121, 122 may, in some embodiments, absorb and distribute impulse via mechanical dampeners and materials. Note that the buffer portion 121, 122 might comprise wheels that roll on the surface 104 or a flat, low-friction foam that slides over the surface 104.

Figure 1B:
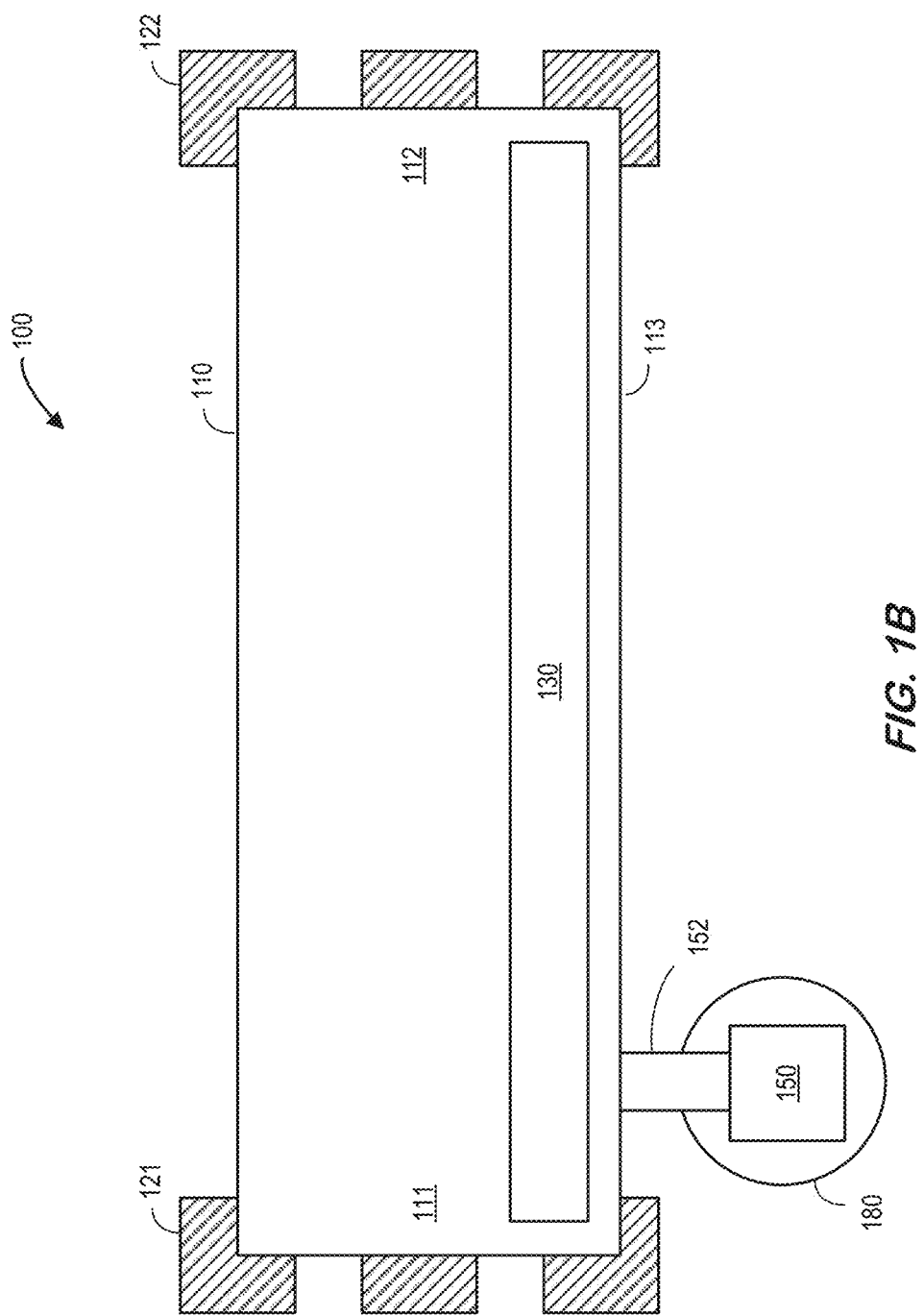

FIG. 1B is another view of the surface treatment system 100 in accordance with some embodiments. As before, the frame body 110 may be positioned parallel to and proximate with an external surface 104 and extend substantially horizontally from a first side 111 to a second side 112 opposite the first side. The first set of buffer portions 121 may be located proximate to the first side 11 to move vertically on the external surface, and the second set of buffer portions 122 may be located proximate to the second side 112 to move vertically on the external surface. The robotic arm 150 may be movably affixed via element 152 near a bottom 113 of the frame body 110 and able to move horizontally along the frame body 110 during treatment of the external surface. The robotic arm 150 may extend to an end proximate with the external surface and the treating portion 180 (e.g., a brush or sponge) may be attached to the robotic arm 150 near the end proximate with the external surface. According to some embodiments, the robotic arm 150 is adapted to rotate, vertically moving the treating portion 180 during treatment of the external surface. Moreover, the treating portion 180 may be separately rotated to remain substantially parallel to and proximate with the external surface during rotation of the robotic arm 150 (e.g., as described with respect to FIGS. 5A and 5B). According to some embodiments, the treating portion 180 might be associated with a rectangular or disc-shaped sponge, a brush, a spinning element, a vibrating element, a spiral-shaped portion, an X-shaped portion, a star-shaped portion, etc. The treating portion may, in some embodiments, be easily replaceable. As used herein, the term "treatment" might refer to cleaning, polishing, painting, resurfacing, pressure washing, etc. Moreover, the treating portion 180 may be adapted to apply a substance or several substances onto the vertical surface during treatment. For example, the substance might comprise a liquid, water, a cleaning agent, soap, steam, an abrasive material, an antifreeze solution, paint, persistent and/or transient surface finishing solutions, another surface treatment solution, etc. The substance might be stored in a tank 130 attached to the frame body 130, be received from a tank on a building rooftop via a flexible hose, etc. In some embodiments, multiple tanks 130 might each hold different solutions that could be applied to the surface being treated. Moreover, the solutions from the liquid storage tanks may flow to and/or from the treating portion via a system of pumps and pipes so that the treating portion remains clean during treatment.

Note that the system's buffer mechanism that holds the robot against a building may disperse load (e.g., across several square feet). Moreover, shock absorbers on the buffers, arm, and internal rail provide from one to five inches of flexibility. Extreme winds of 100 miles per hour may move the robot minimally relative to the dampening threshold. Other possible shocks (e.g., birds) will deliver similarly minimal forces that can be adequately absorbed. Such robust weatherproofing may allow the robot to operate during rain or snow if desired.

In some embodiments, the frame body 110 is modular such that it can be transported more easily (e.g., by two people). For example, the system 100 might consist of a number of frame units (e.g., ten-foot wide segments) which may be joined together, a number of robotic arms 150 (which may sit on the same rail), and two buffers. The frames, arms, and buffers may be considered the "modules" of the system 100. In some embodiments, the system 100 can employ any number of frames, one to four arms, and can vary the buffer size and/or placement to provide design flexibility.

Figure 1C:
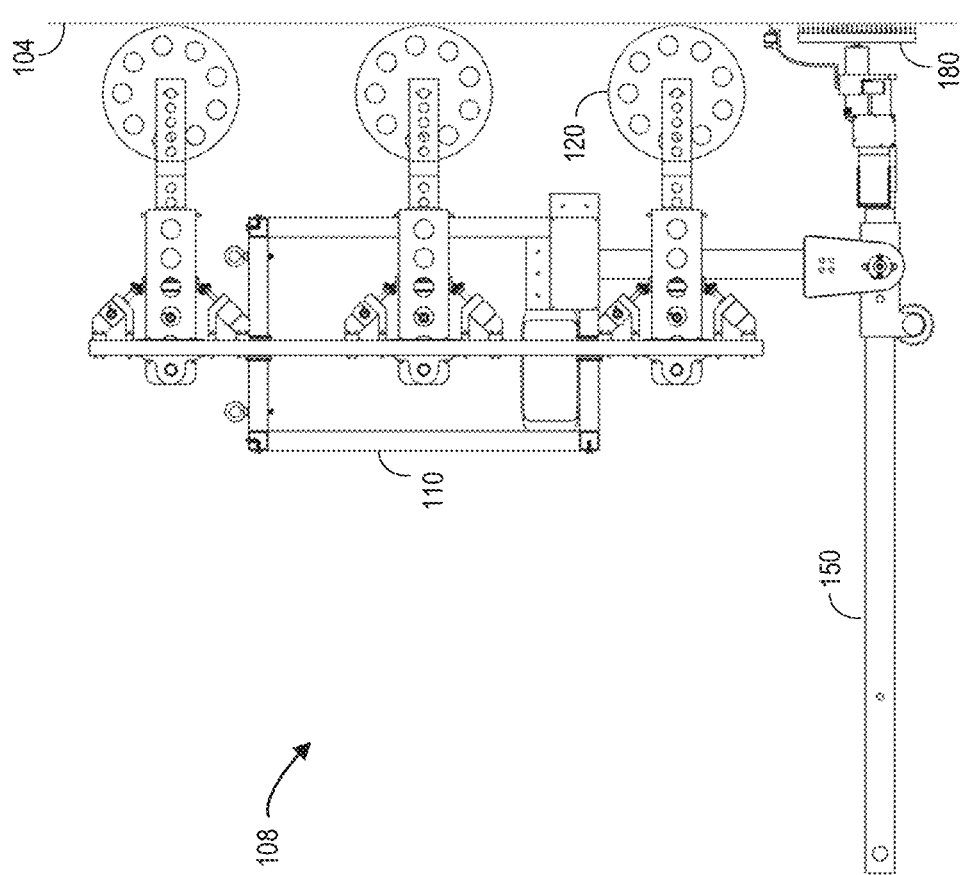

FIG. 1C is a side view 108 showing buffers 120 attached to the frame body 110 supporting the apparatus against the surface 104 being treated (e.g., cleaned). The robotic arm 150 and treating portion 180 are arranged to provide treatment to the surface. FIG. 1D is an additional side view 109 that includes cameras 190 to capture images or other information about the surface 104 being treated and/or the treating portion 180 in substantially real time (e.g., to help guide a remote human operator who is controlling movement of the system 100). In some embodiments, the robot may also be outfitted with traditional, infrared, ultraviolet, or other lights to permit safe operation in ambient darkness. Similarly, distance measuring devices, such as Light Detection And Ranging ("LiDAR"), may be employed to determine the location and shape of surface features. For example, the surface may be illuminated with laser light or infrared light to determine three-dimensional information. The cameras 190 and/or other sensors might be attached to the fame body, the robotic arm, a treating portion, etc.

Figure 2A:
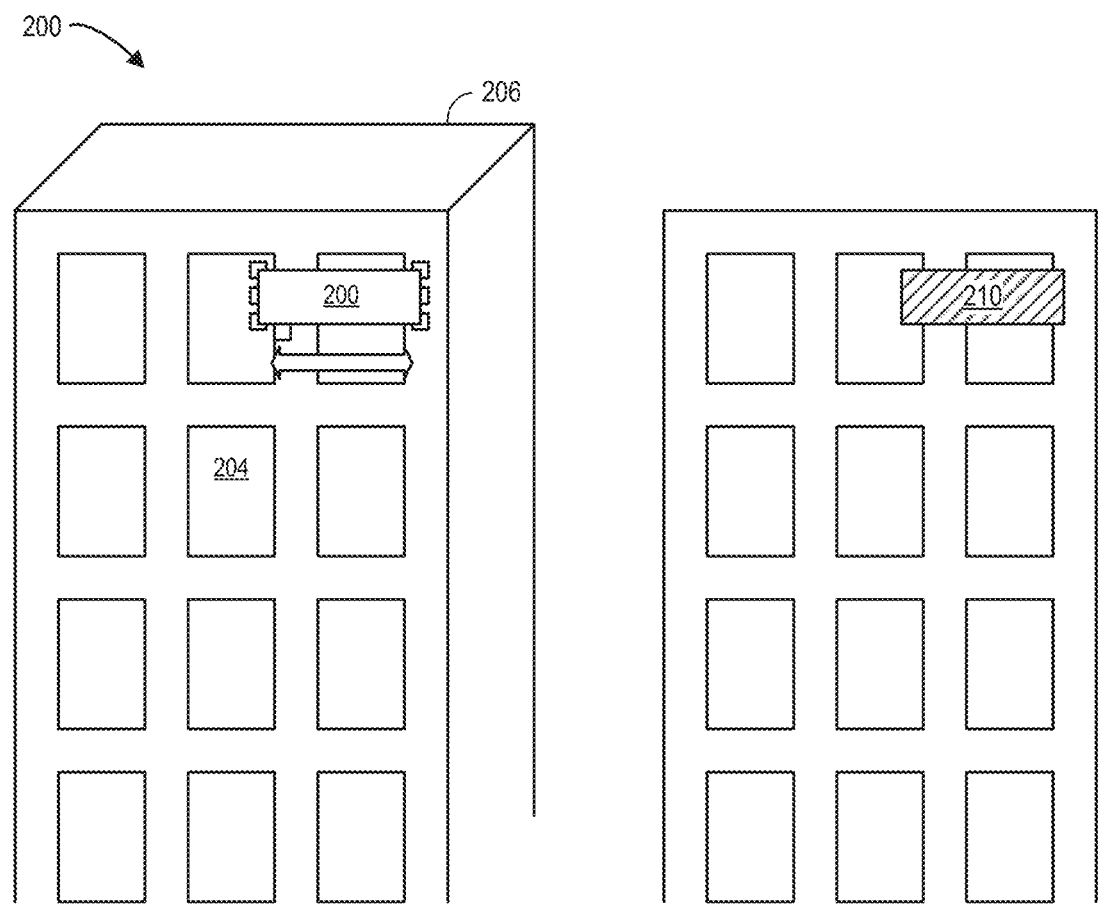
FIGS. 2A and 2B illustrate motion of a surface treatment system in accordance with some embodiments.
Figure 2B:
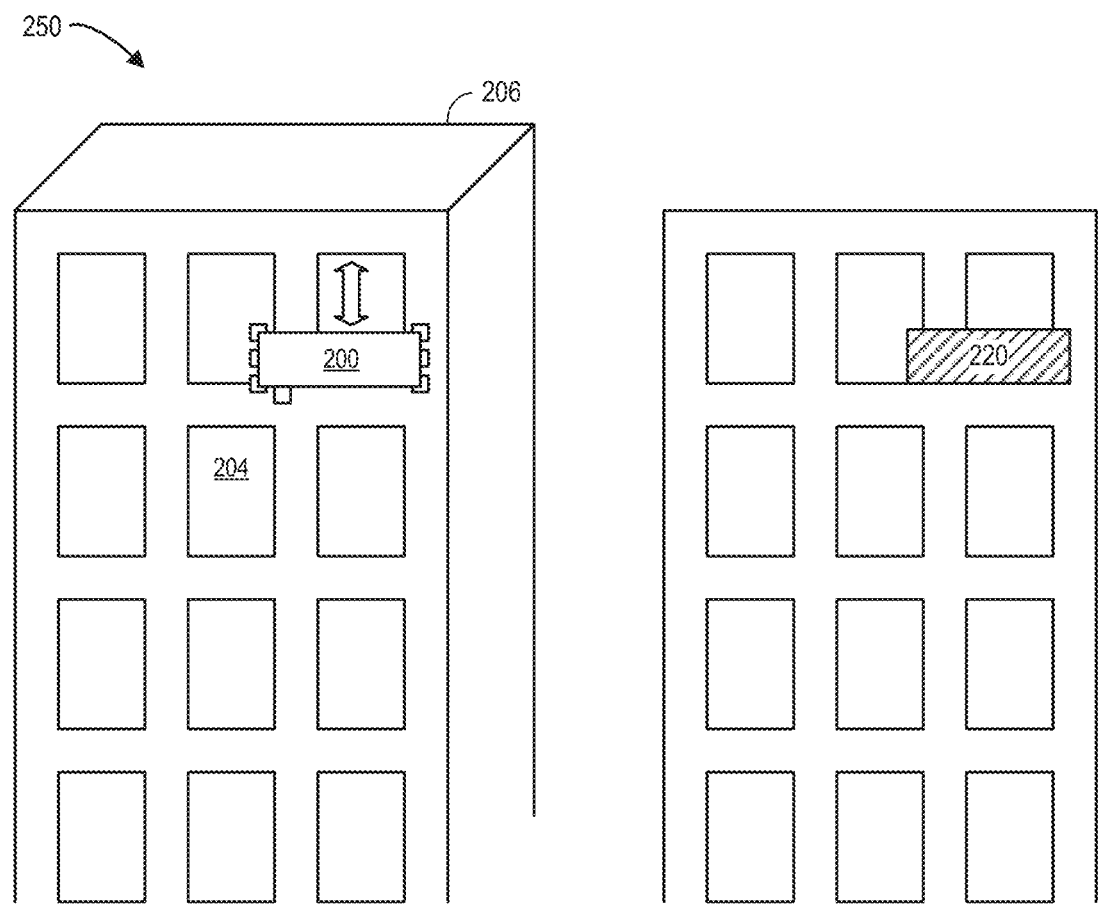

FIGS. 2A and 2B illustrate motion of a surface treatment system in accordance with some embodiments. In shown 200 in FIG. 2A, a surface treatment system 200 is placed proximate to a surface 204 of a structure 206. A robotic arm may move horizontally along the system 200 (e.g., left-to-right as illustrated by the arrow in FIG. 2A) and rotate to move a cleaning brush or other treatment tool up-and-down. The resulting area 210 cleaned is shown by cross-hatching in FIG. 2A. After the area is cleaned, FIG. 2B shows 250 that the surface treatment system 200 has been lowered down the surface 204 of the structure 206 (as illustrated by the arrow in FIG. 2B). The robotic arm may again move horizontally along the system 200 (e.g., left-to-right) and rotate to move the cleaning brush up-and-down. The resulting area 220 cleaned is again shown by cross-hatching in FIG. 2B.

Figure 3:
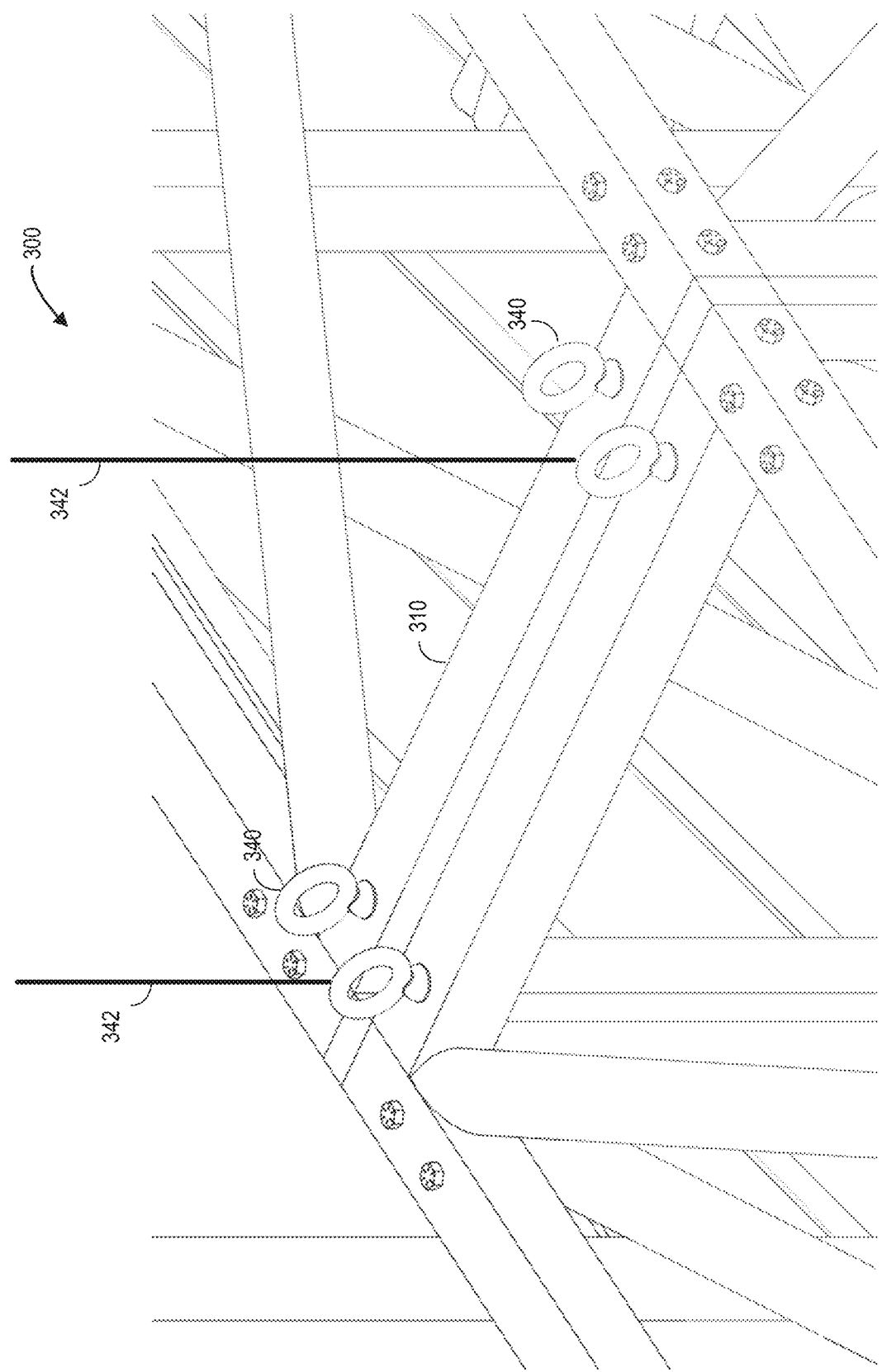
FIG. 3 illustrates connections to a surface treatment system according to some embodiments.

The surface treatment system 200 may be moved up and/or down the structure 206 using cables. For example, at least one connecting portion on the frame body may be adapted to be attached to a cable to provide for vertical movement of the frame body. FIG. 3 illustrates 300 connections to a surface treatment system according to some embodiments. Several hooks 340 attached to a frame body 310 may be attached to cables 342. Although two hooks 340 are shown in FIG. 3, any number of such connecting portions may be provided (and might be positioned to be similar to connecting portions of conventional window washing platforms). According to some embodiments, at least one connecting portion attaches to the cable 342 via tethering latches and rigs.

Figure 4:
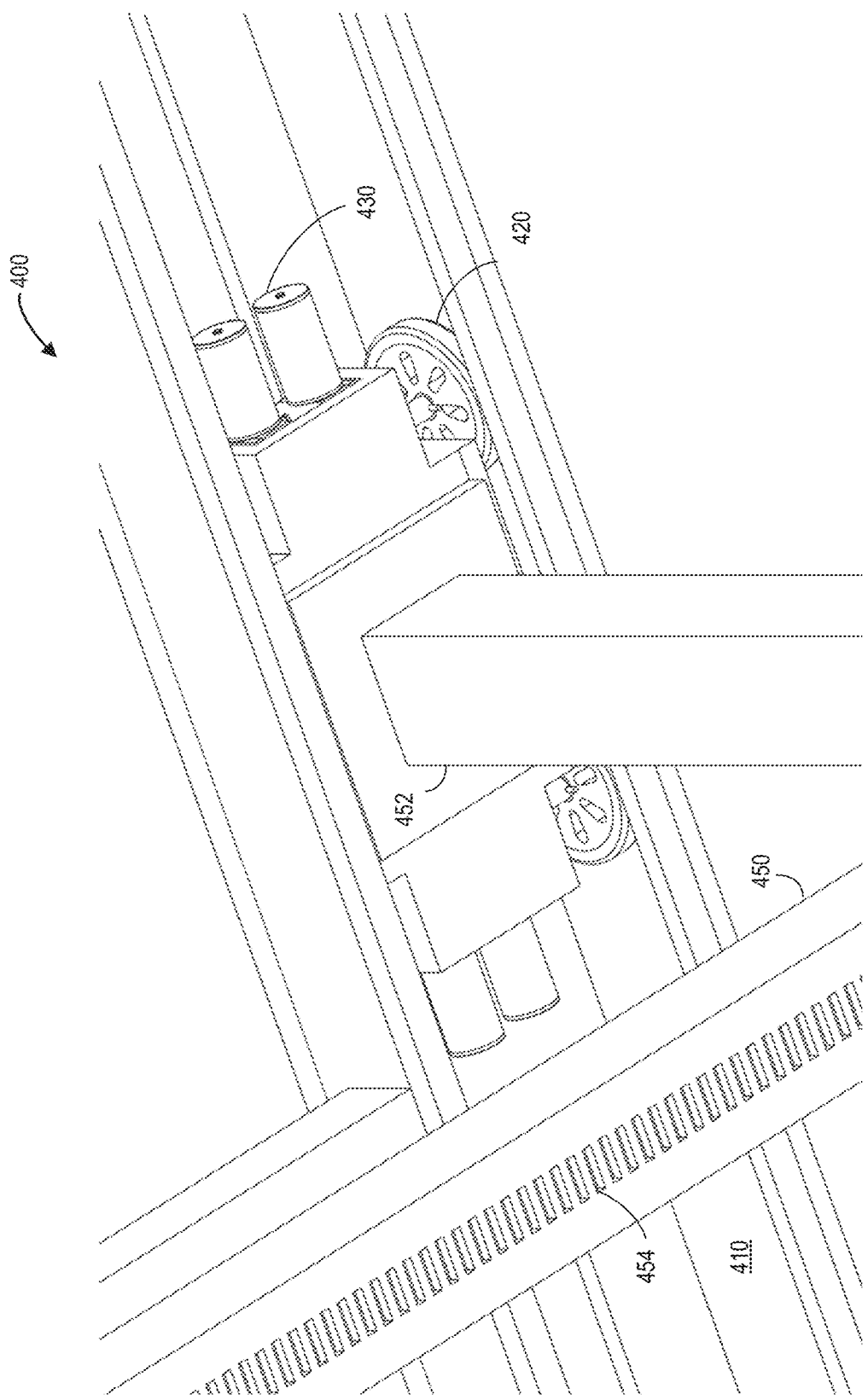
FIG. 4 shows how a robotic arm may be movably affixed to a frame body in accordance with some embodiments.

FIG. 4 shows 400 how a robotic arm 450 may be movably affixed to a frame body 410 via an element 452 in accordance with some embodiments. The robotic arm 450 may have a series of slots or recesses 454 what work with a gear to facilitate movement of the arm as described with respect to FIGS. 5A and 5B. A carriage with wheels 420 may sit within a recess of the frame body 410. According to some embodiments, at least one rotary motor 430 (e.g., four motors 430, one for each wheel 420) may turn the wheels 420 to move the robotic arm 450 horizontally along the frame body 410. That is, the robotic arm 450 may roll horizontally along a rail car and track of the frame body 410 via the rotary motor.

Figure 5A:
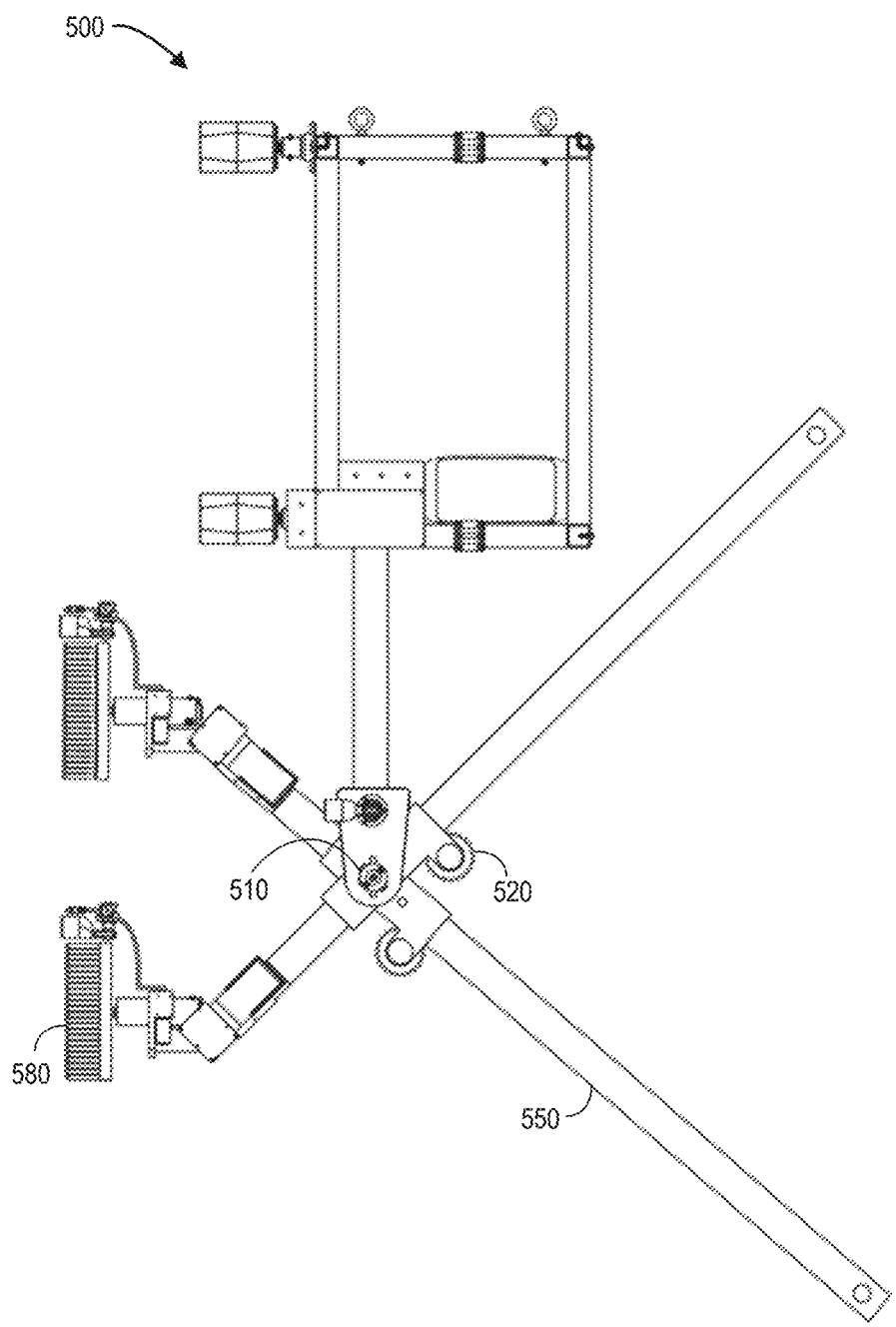
FIGS. 5A and 5B illustrate rotation of a robotic arm according to some embodiments.
Figure 5B:
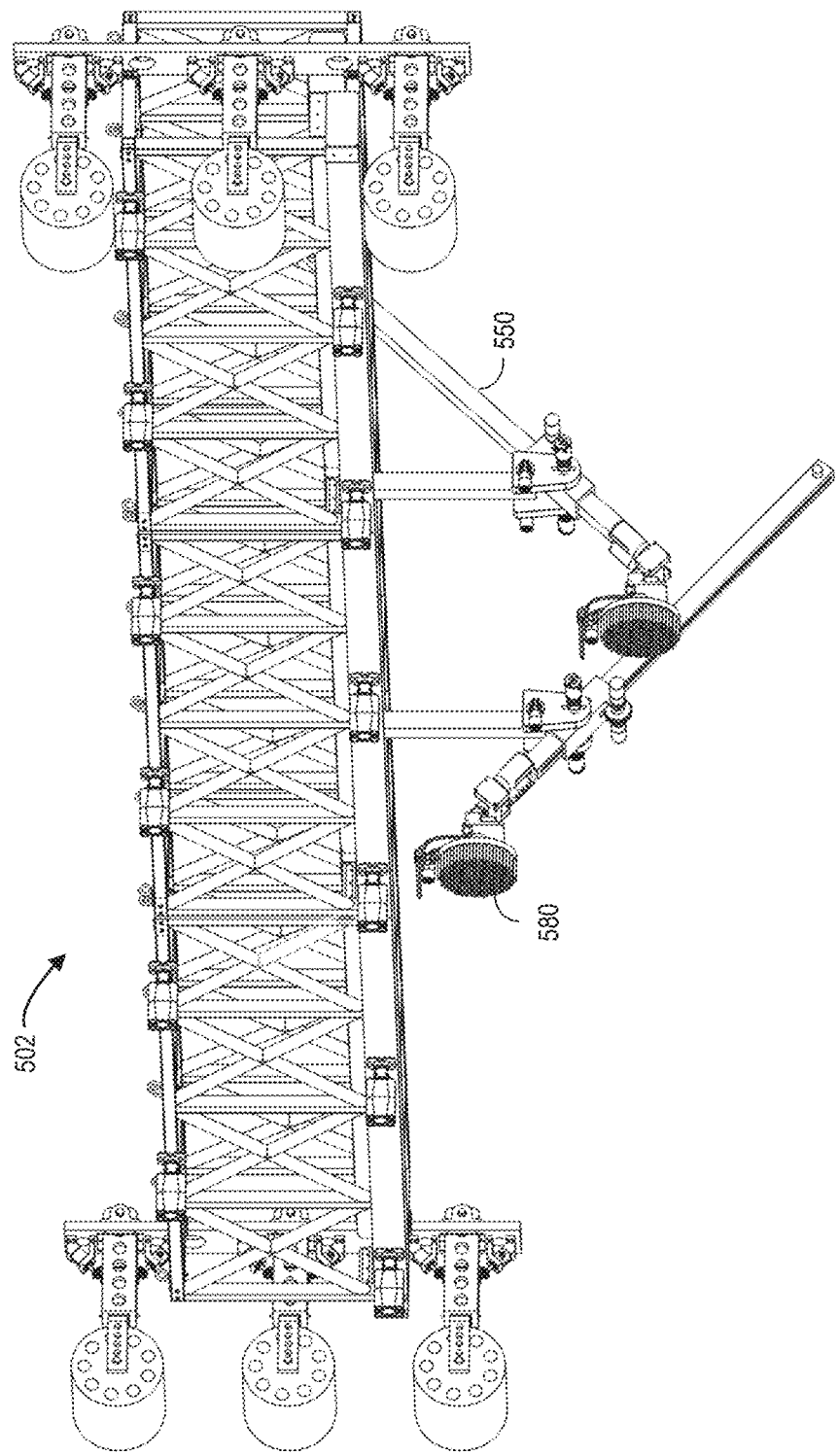

FIGS. 5A and 5B illustrate rotation of a robotic arm according to some embodiments. In particular, FIG. 5A shows a side view 500 of two robotic arms 550: one rotated up and one rotated down. Note that a treating portion 580 is positioned vertically (e.g., to clean a vertical window) in both cases. The robotic arm 550 may rotate vertically about an axel 510 (e.g., to move the treating portion 580 up-and-down). According to some embodiments, teeth of a gear 520 may interact with the slots or recesses 454 shown in FIG. 4 to extend the robotic arm 550 during this rotation. FIG. 5B is a three-dimensional perspective view 502 of two robotic arms: one rotated up and one rotated down. Note that the treating portion 580 may be adapted (e.g., to rotate separately from the rotation of the robotic arm 550) to automatically remain substantially parallel to an external surface of a structure being cleaned. In some embodiments, the treating portion 580 (e.g., cleaning sponge) stays parallel to a window because of its own motors at the head. Software may link the motors that (i) extend and retract the arm, (ii) rotate the arm up and down, and (iii) rotate the head up and down. These motors running in tandem may provide human arm mimicry for the robotic system.

Figure 6A:
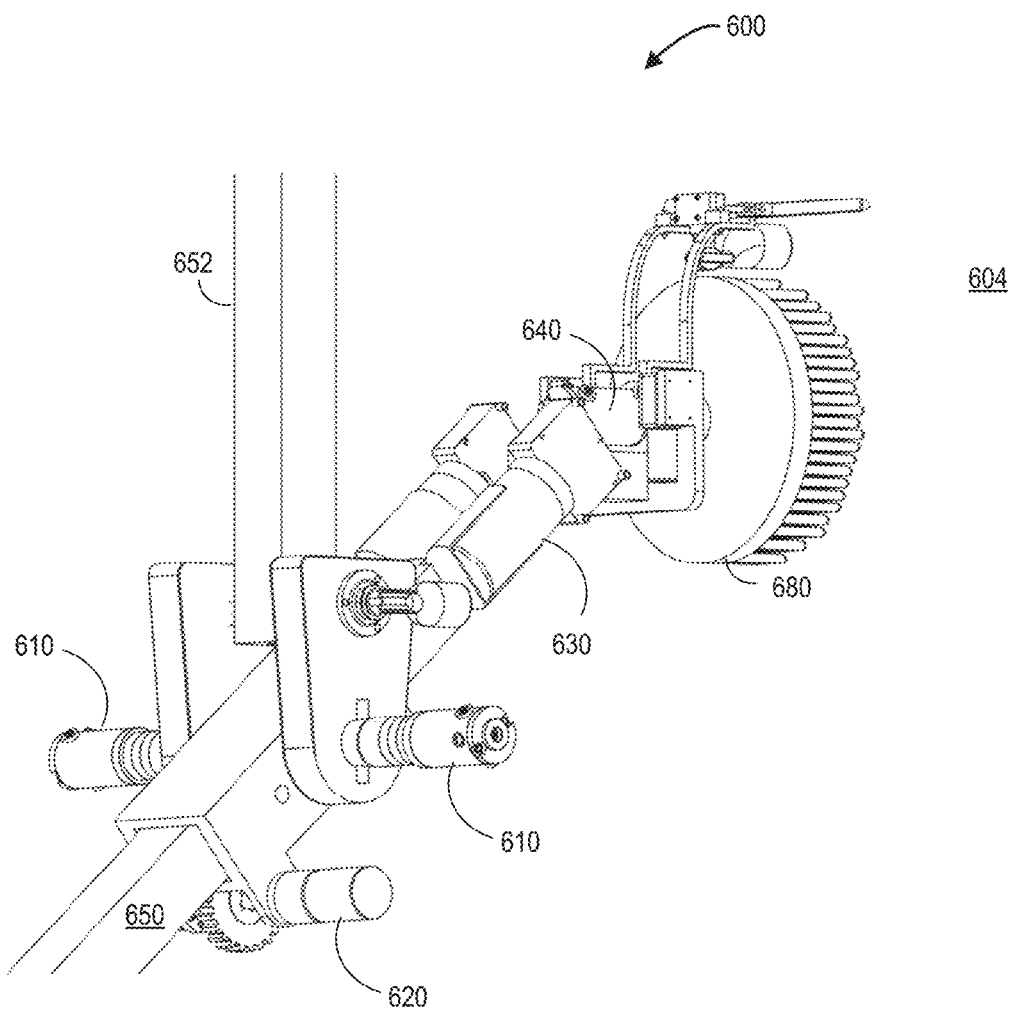
Figure 6B:
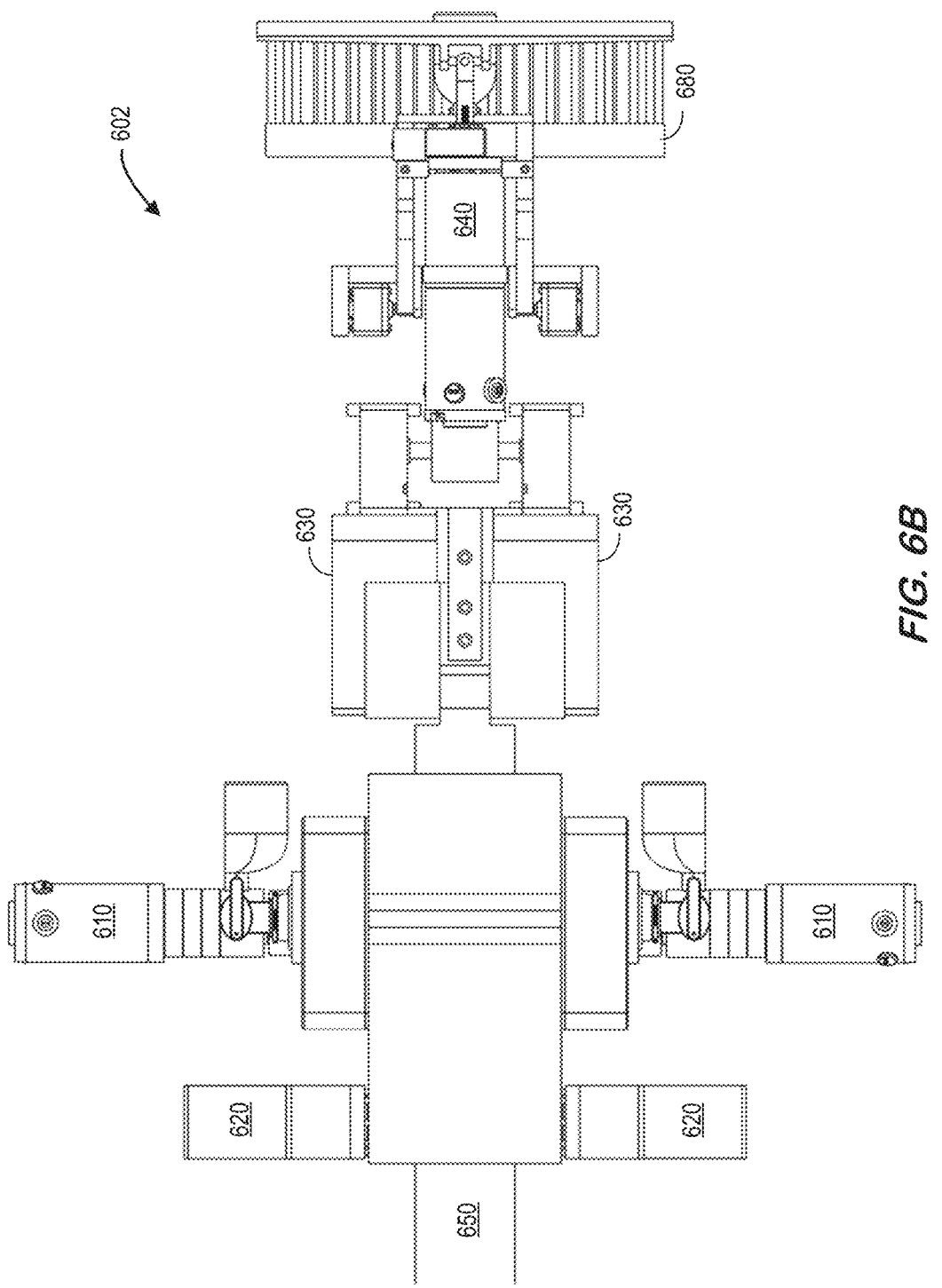
Figure 6D:
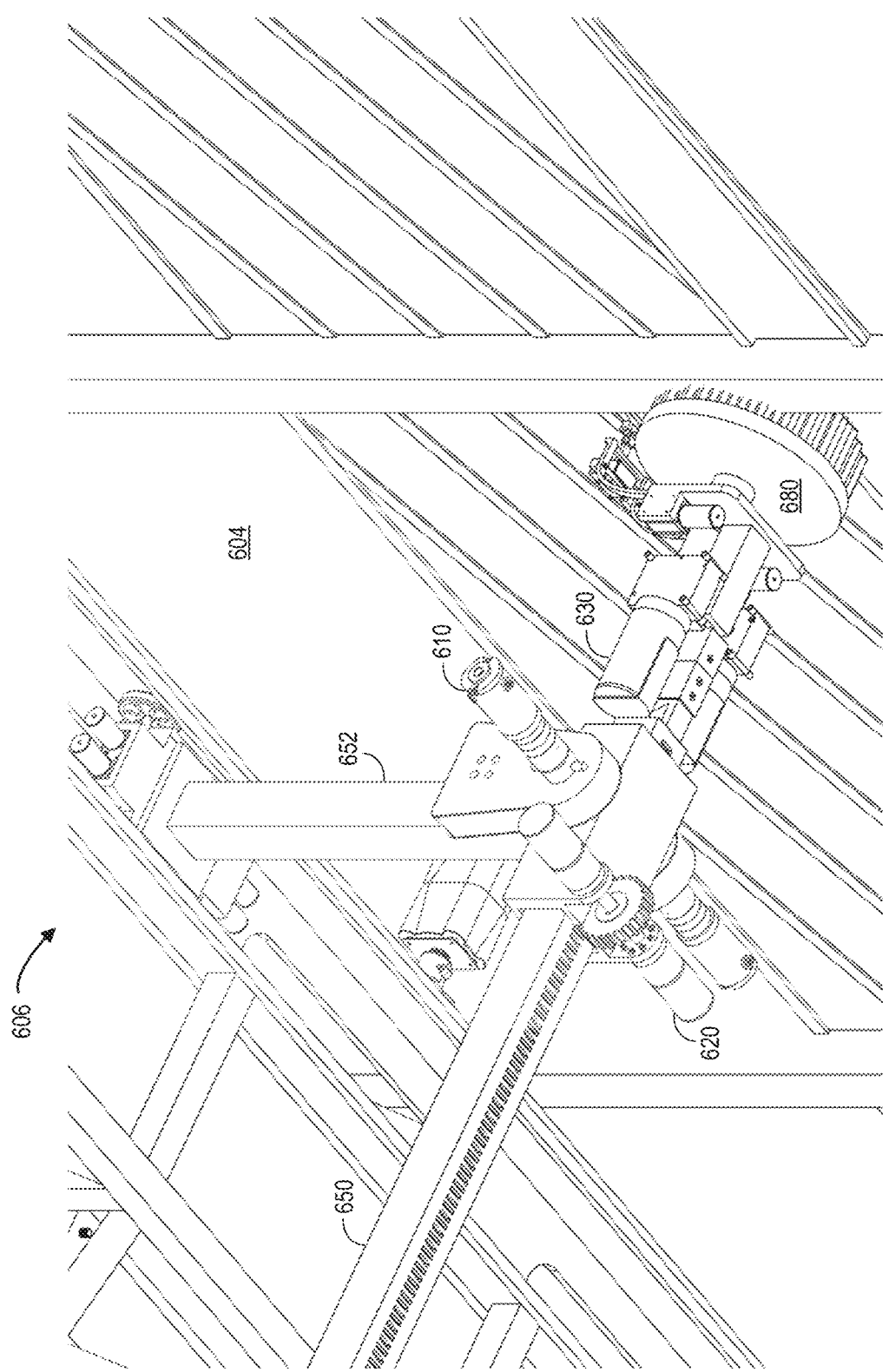

FIGS. 6A through 6D are more detailed views of a robotic arm 650 in accordance with some embodiments. As shown in FIG. 6A, a pair of rotary motors 610 rotate the entire robotic arm 650 (attached to the frame body via element 652) while another pair of rotary motors 620 extend and retract the robotic arm 650 during rotation to keep a cleaning portion 680 against an external surface 604 being cleaned. Another pair of rotary motors 630 rotate the entire head of the robotic arm 650 while another motor 640 spins and/or vibrates the cleaning portion 680 to clean the window. FIG. 6B is a top-down view 602, FIG. 6C is a three-dimensional view 605 of this portion of the apparatus, and FIG. 6D is yet another three dimensional view 606 of the robotic arm 650, supporting element 652, treating portion 680, and motors 610, 620, 630 in accordance with some embodiments.

Figure 7A:
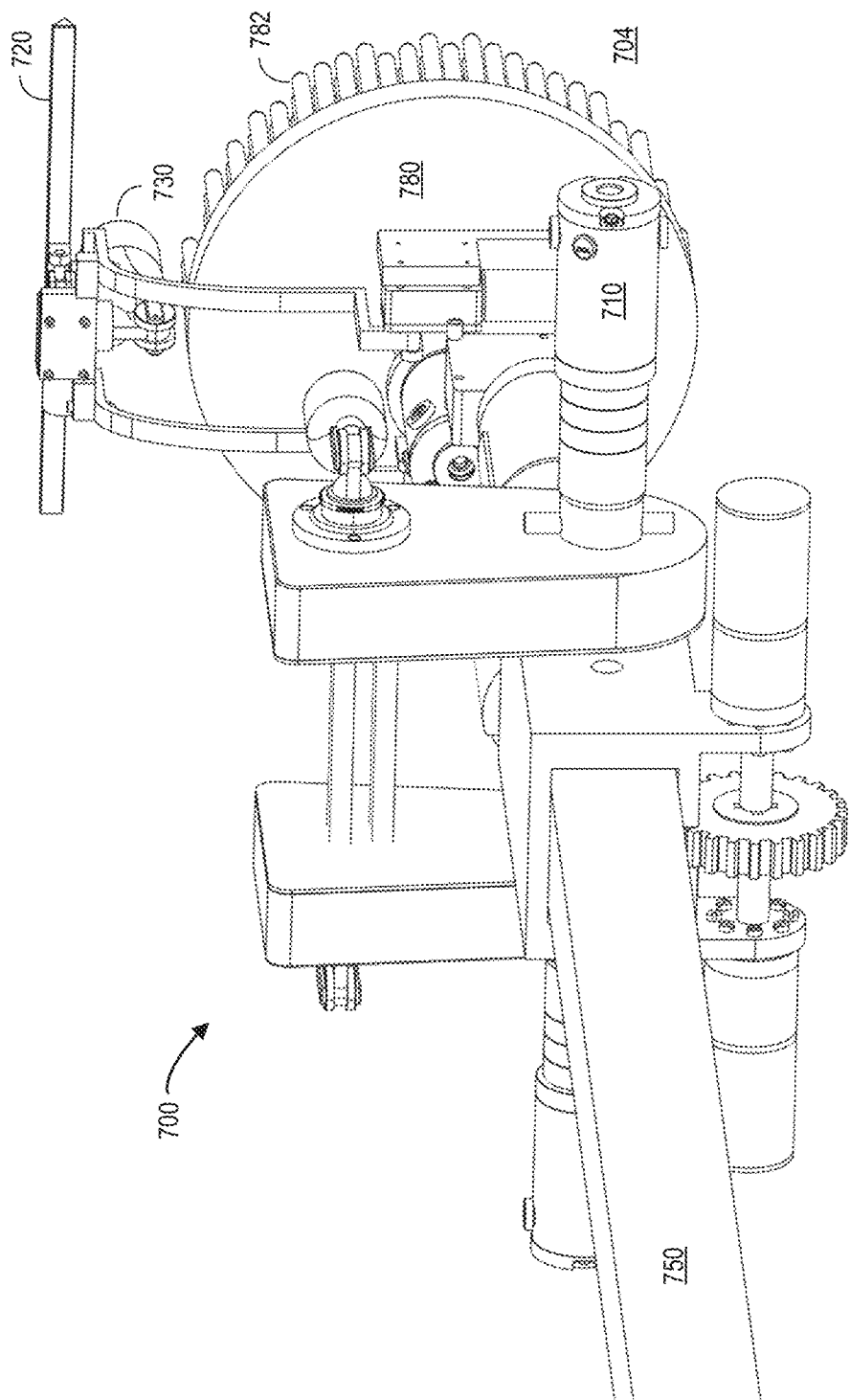
FIG. 7A is a cleaning head according to some embodiments.

FIG. 7A is a more detailed view 700 of a cleaning head 780 attached to a robotic arm 750. The cleaning head 780 may have bristles 782 that may be used to clean an external surface 704 according to some embodiments. In some embodiments, one or more motors 710 may engage and disengage a movable wiper blade 720 with the external surface 704 to retract sufficiently to clear recessions or oddly shaped feature of the external surface 704. According to some embodiments, another motor 730 may tilt and/or rotate the wiper blade 720. Such a feature, for example, may help the system clean or otherwise handle oddly shaped features of the external surface 704.

Figure 7B:
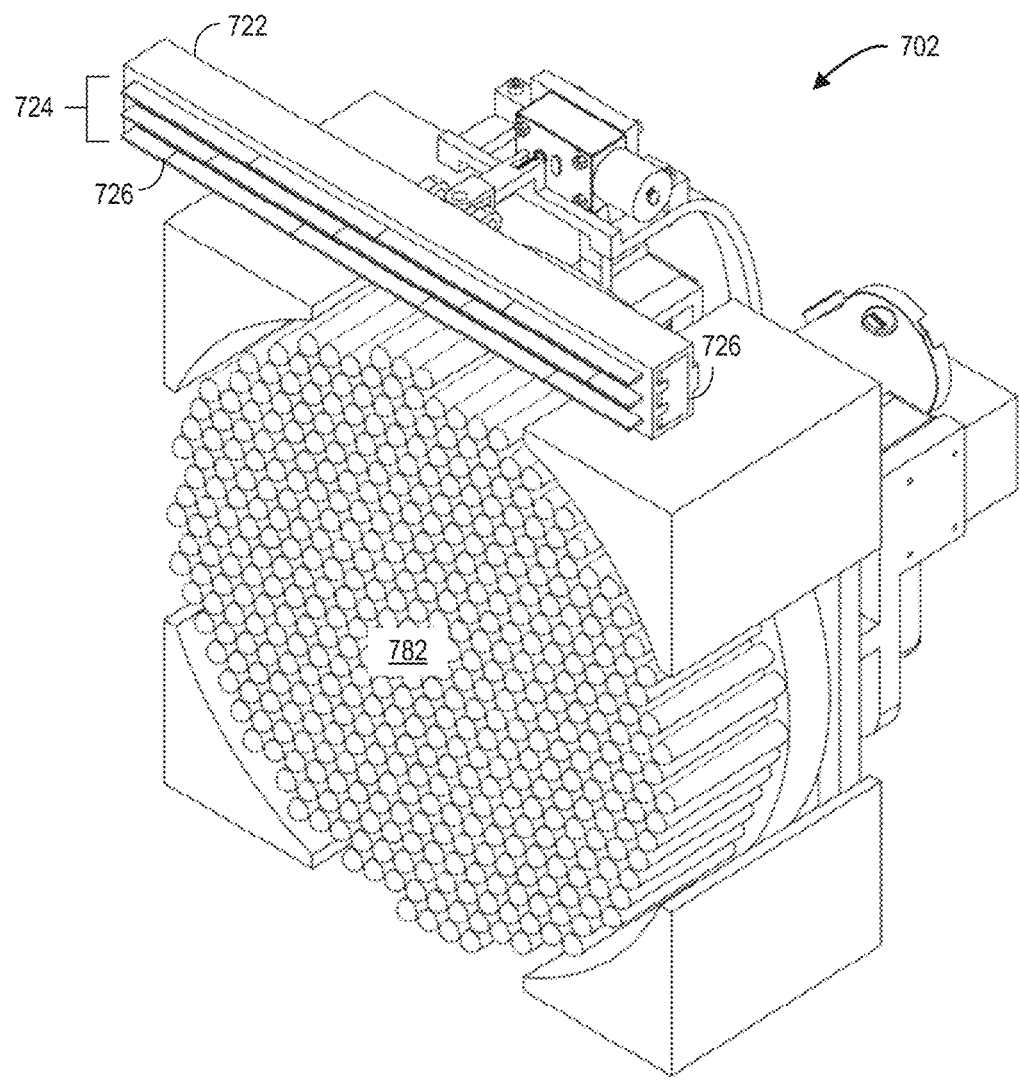
FIG. 7B is an alternative cleaning head module according to some embodiments.

FIG. 7B is an alternative cleaning head module 702 with flexible bristles 782 according to some embodiments. The module 702 might, for example, be removably attached to a robotic arm and swappable with identical cleaning head modules, cleaning head modules having different designs, modules designed to apply other types of treatments to a surface, etc. The module 702 of FIG. 7B includes a wiper assembly 722 containing a set of three parallel wiper blades 724. According to some embodiments, the set of wiper blades 724 can be retracted by an operator into an interior chamber 726 of the wiper assembly 722. In some embodiments, each blade in the set 724 includes a series of slits 728. As shown in FIG. 7B, the location of the slits 728 can be offset between different wiper blades. In this way, the slits 728 may let water or other liquids travel through a blade at specific intervals to be picked up by other blades to better clean the surface.

Figure 8A:
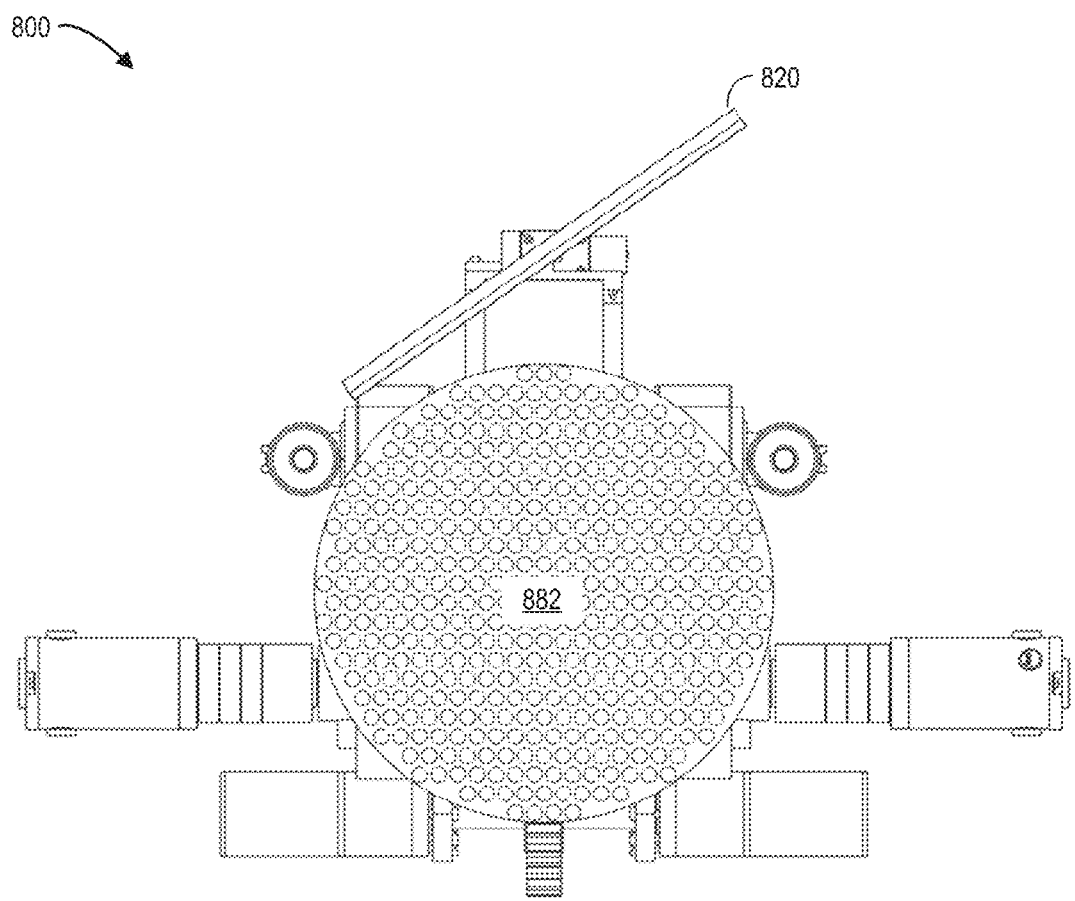
FIGS. 8A through 8E illustrate wiper blade tilt and rotation in accordance with some embodiments.
Figure 8B:
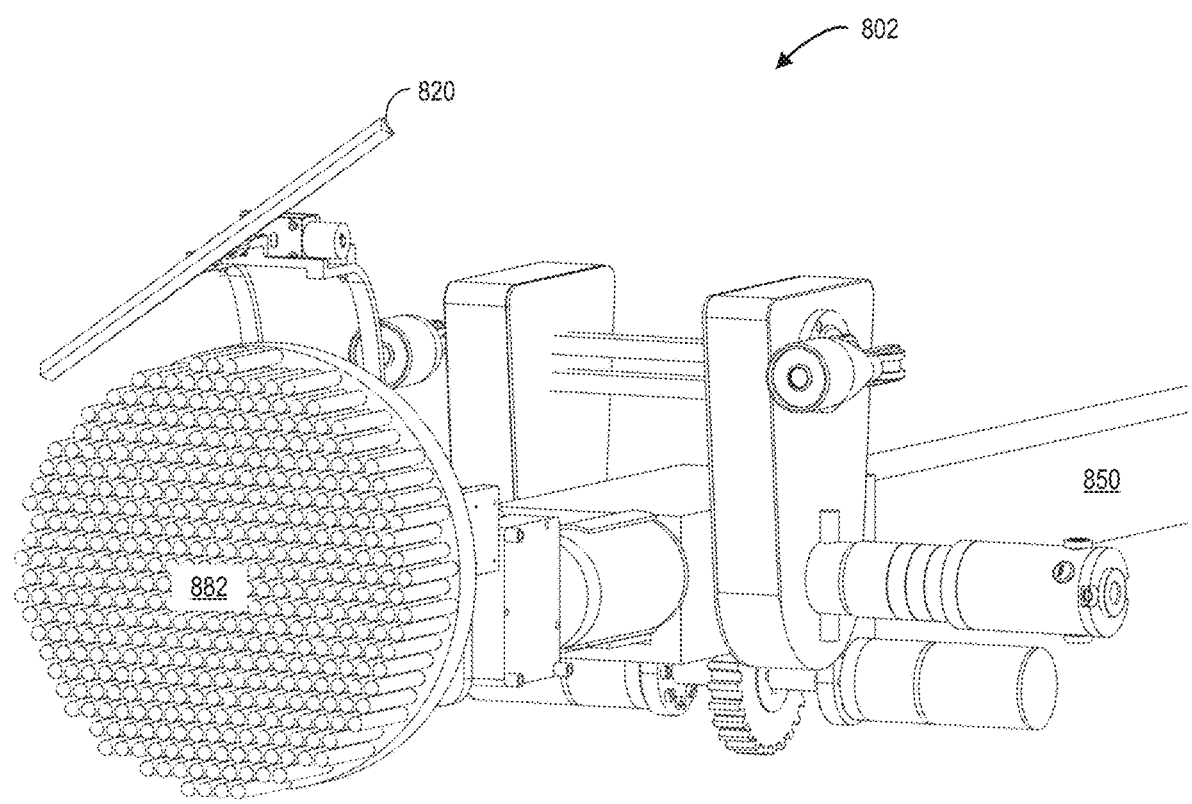
Figure 8C:
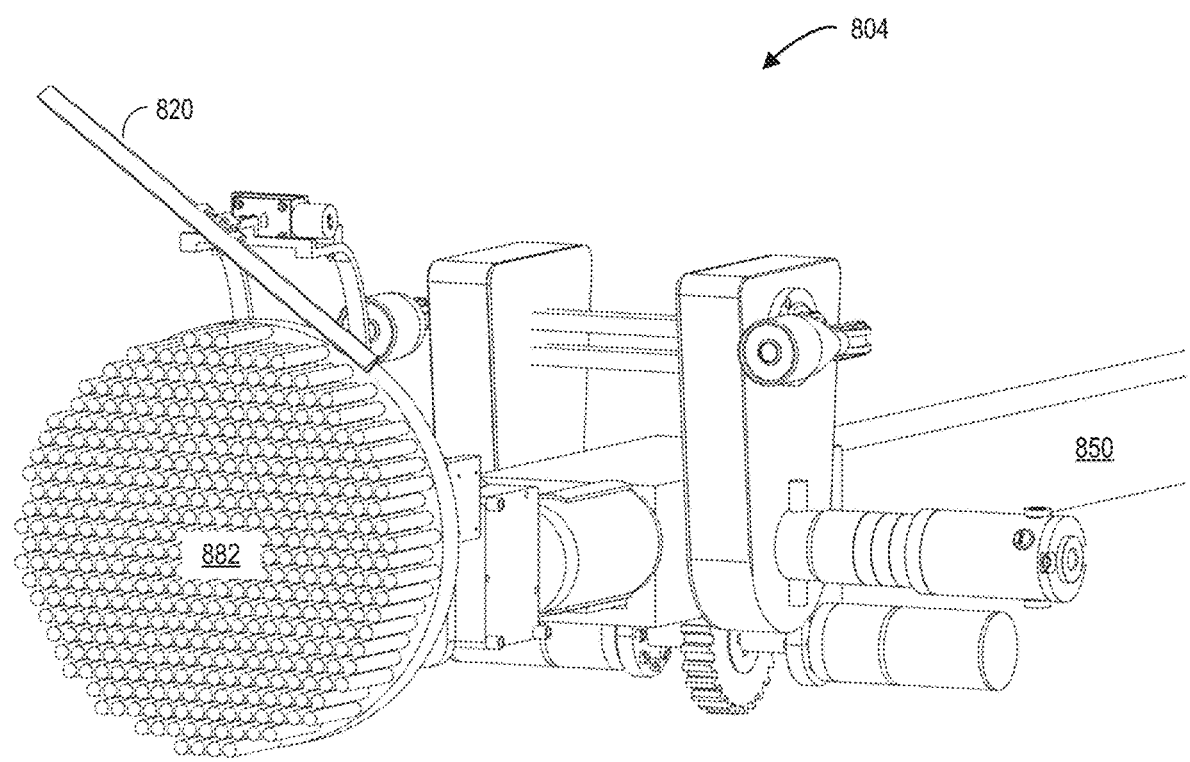
Figure 8D:
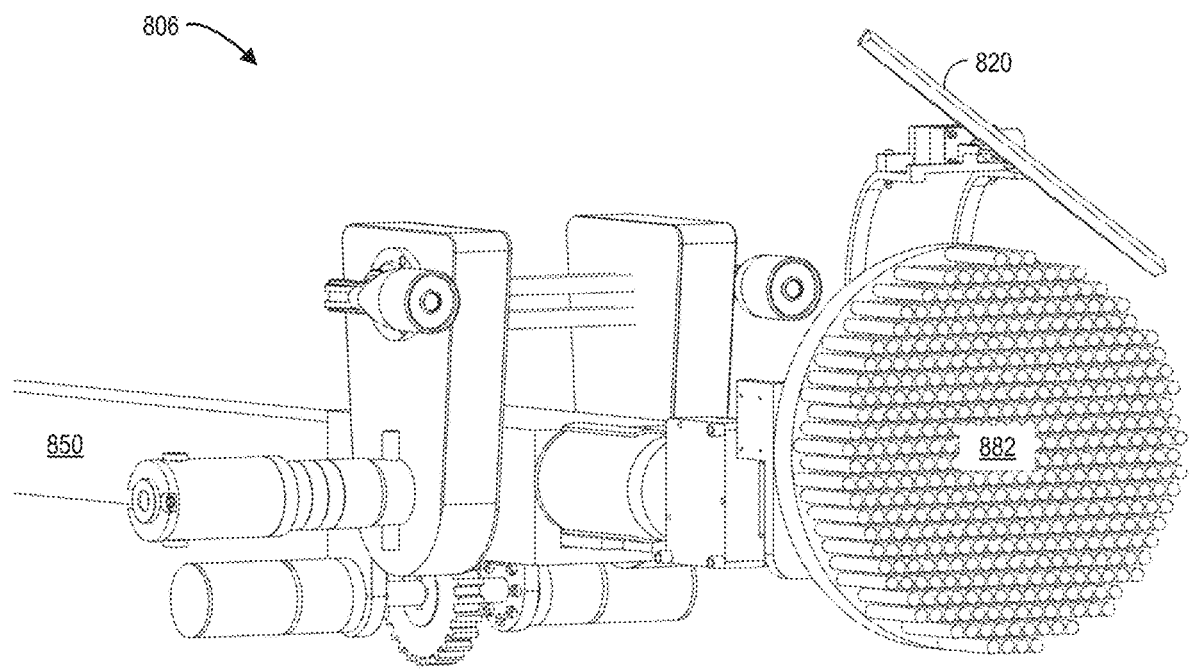
Figure 8E:
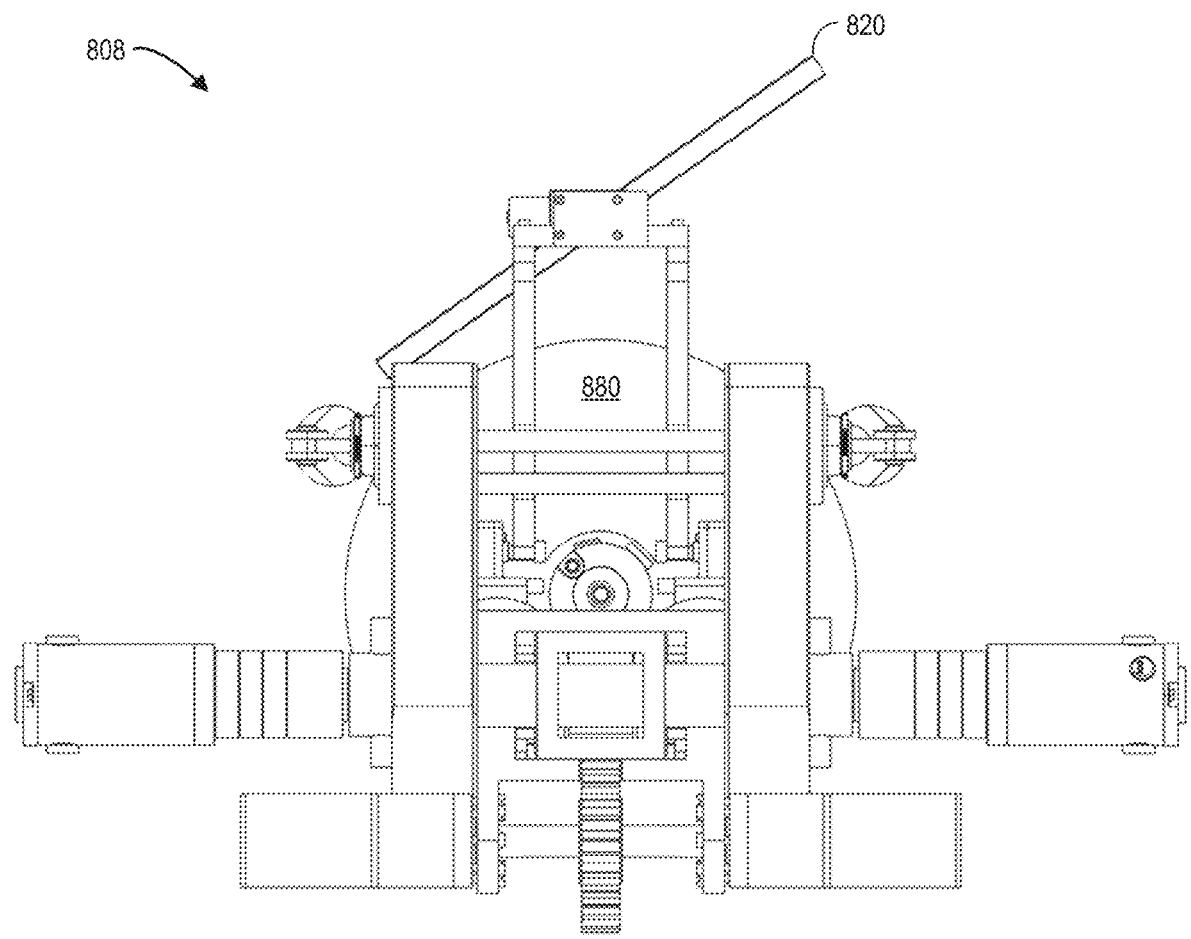

FIGS. 8A through 8E illustrate wiper blade tilt and rotation in accordance with some embodiments. In particular, FIG. 8A is a front view 800 of a cleaning portion with bristles 882 showing a wiper blade 820 rotated counter-clockwise and FIG. 8B is a three-dimensional perspective view 802 of the apparatus attached to a robotic arm. FIG. 8C is a view 804 that shows the wiper blade 820 rotated clockwise, FIG. 8D is a view 806 that shows the tilt of the wiper blade 820, and FIG. 8E is a rear view 808 of the apparatus including a cleaning portion and the wiper blade 820. As can be seen in FIGS. 8A through 8E, the tilt capability of the wiper blade 820, achieved by a torsion spring mechanism, may help ensure that the wiper blade 840 is in appropriately angled contact with the surface to wipe away debris and cleaning fluids. The wiper blade 820 rotation may help the wiper blade 820 engage traditional corners from two directions (horizontally and vertically) and/or let the robot handle oddly shaped windows (e.g., triangular).

Figure 9B:
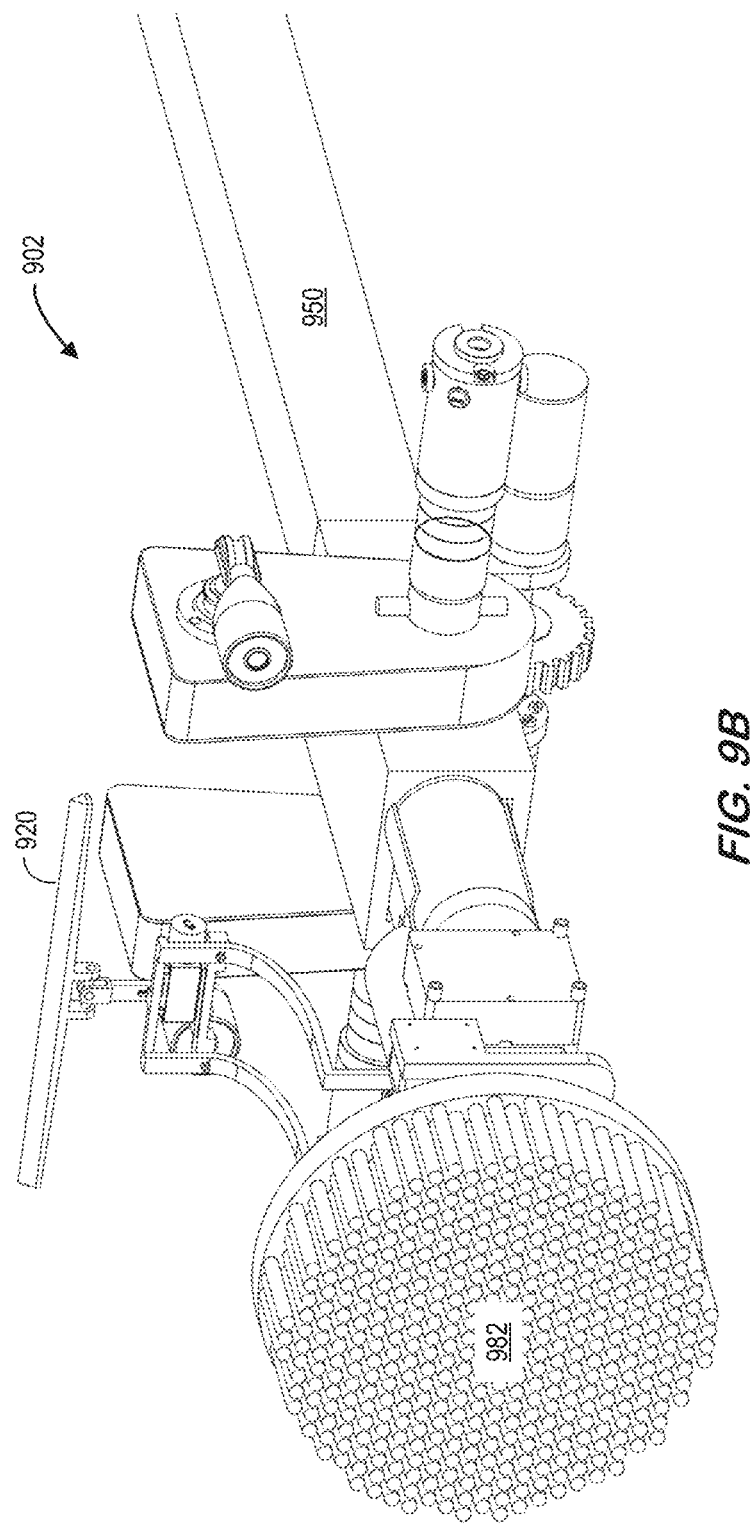
Figure 9C:
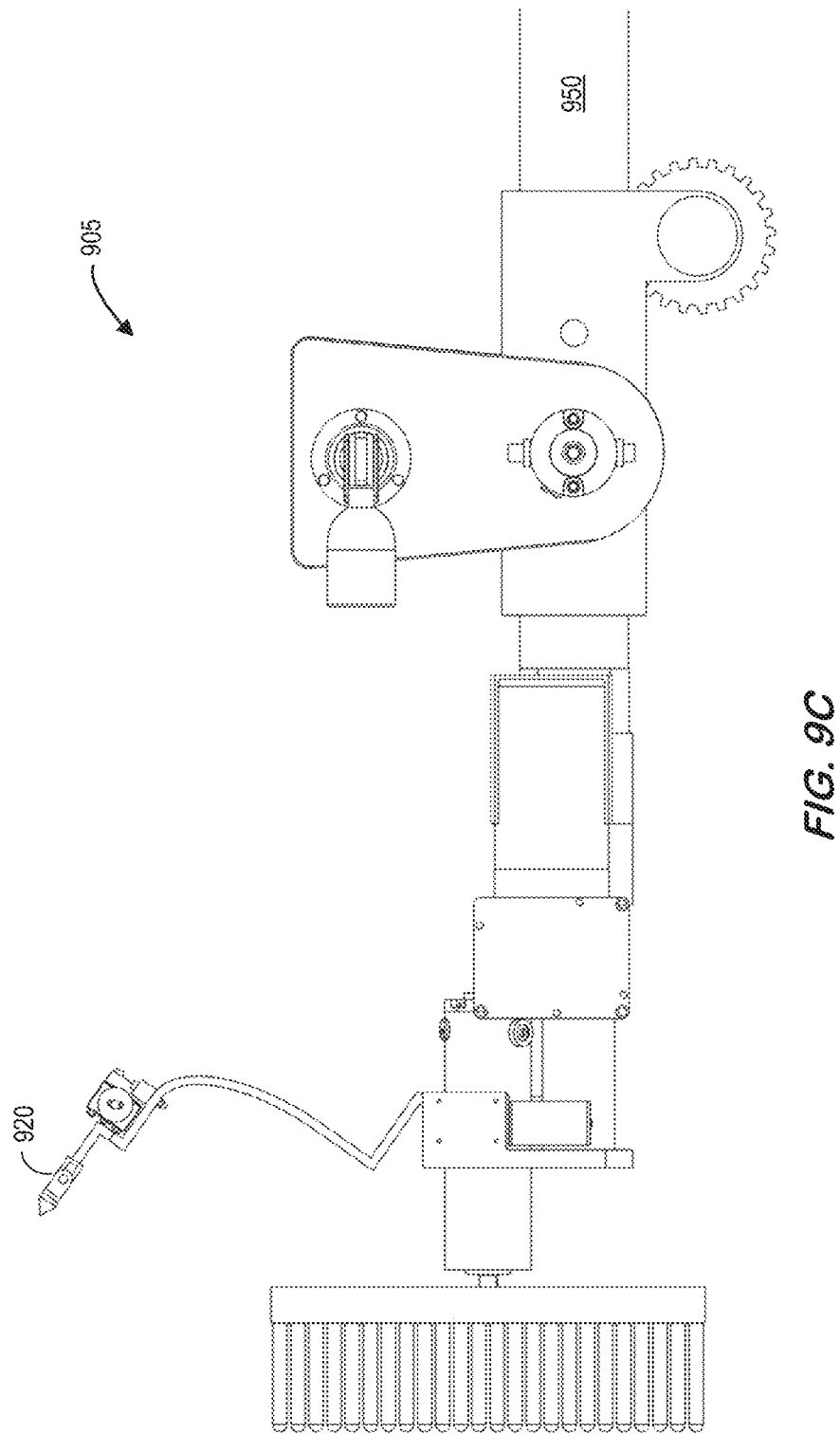
Figure 9D:
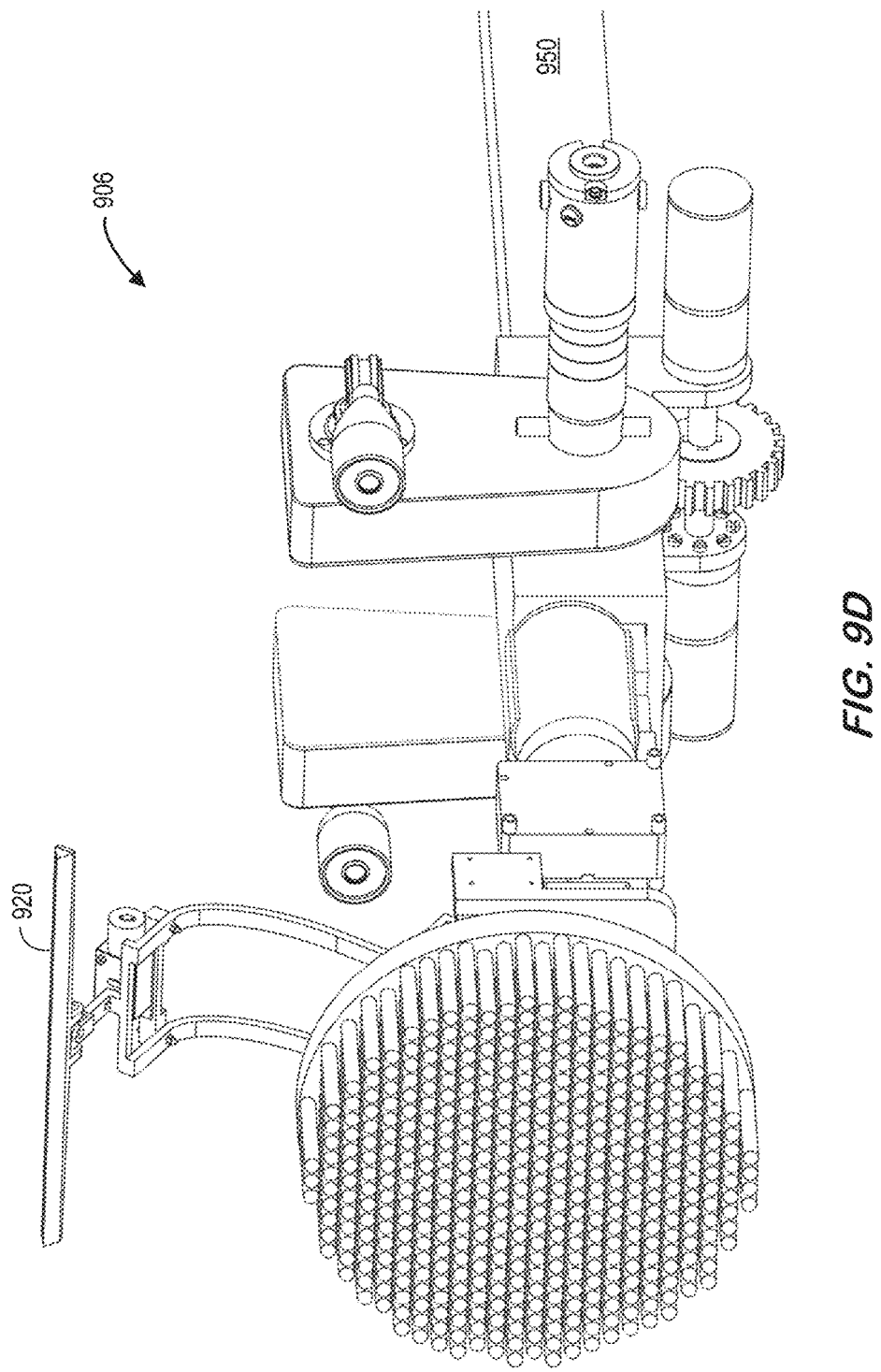
Figure 9E:
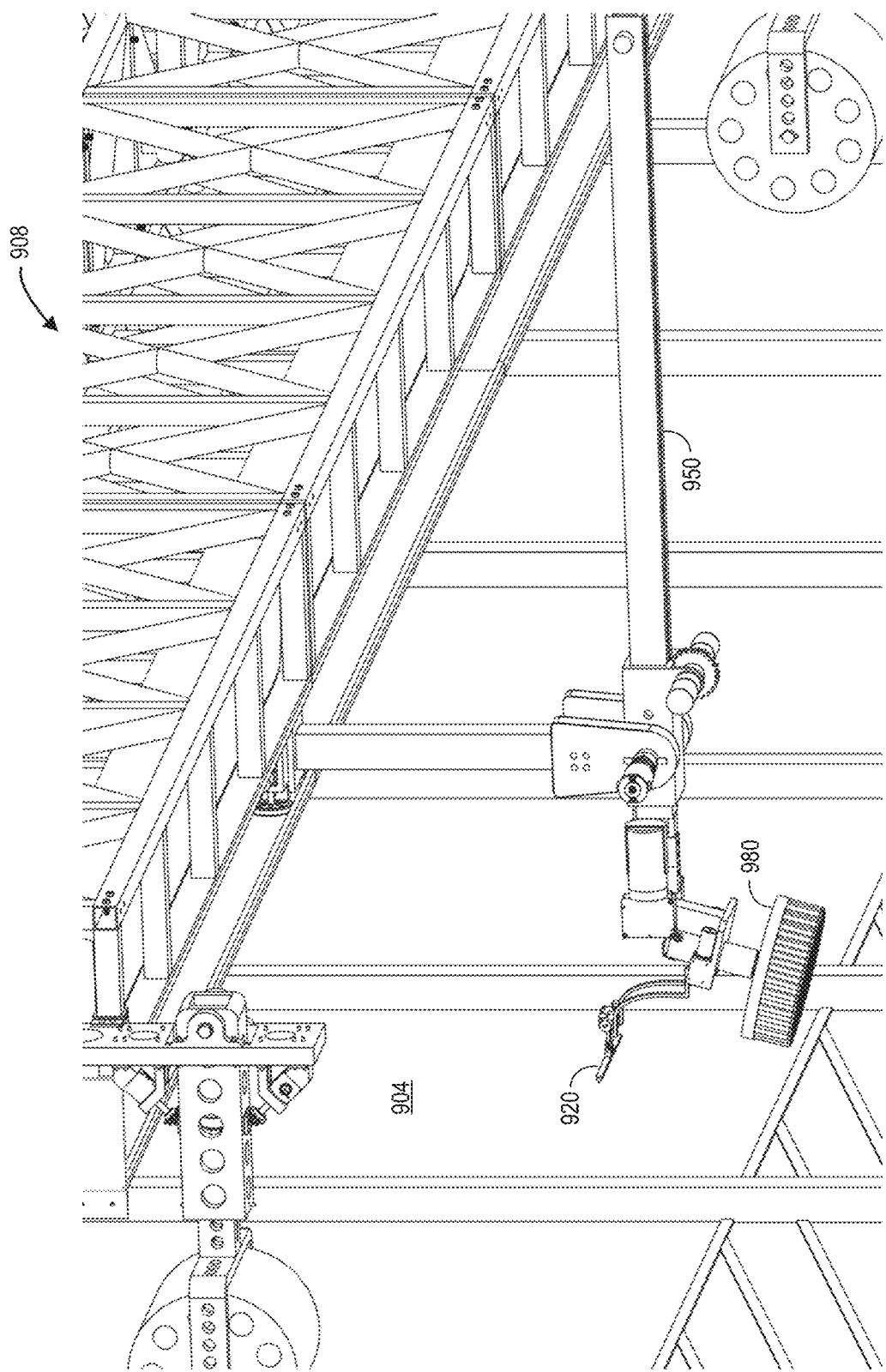
Figure 9G:
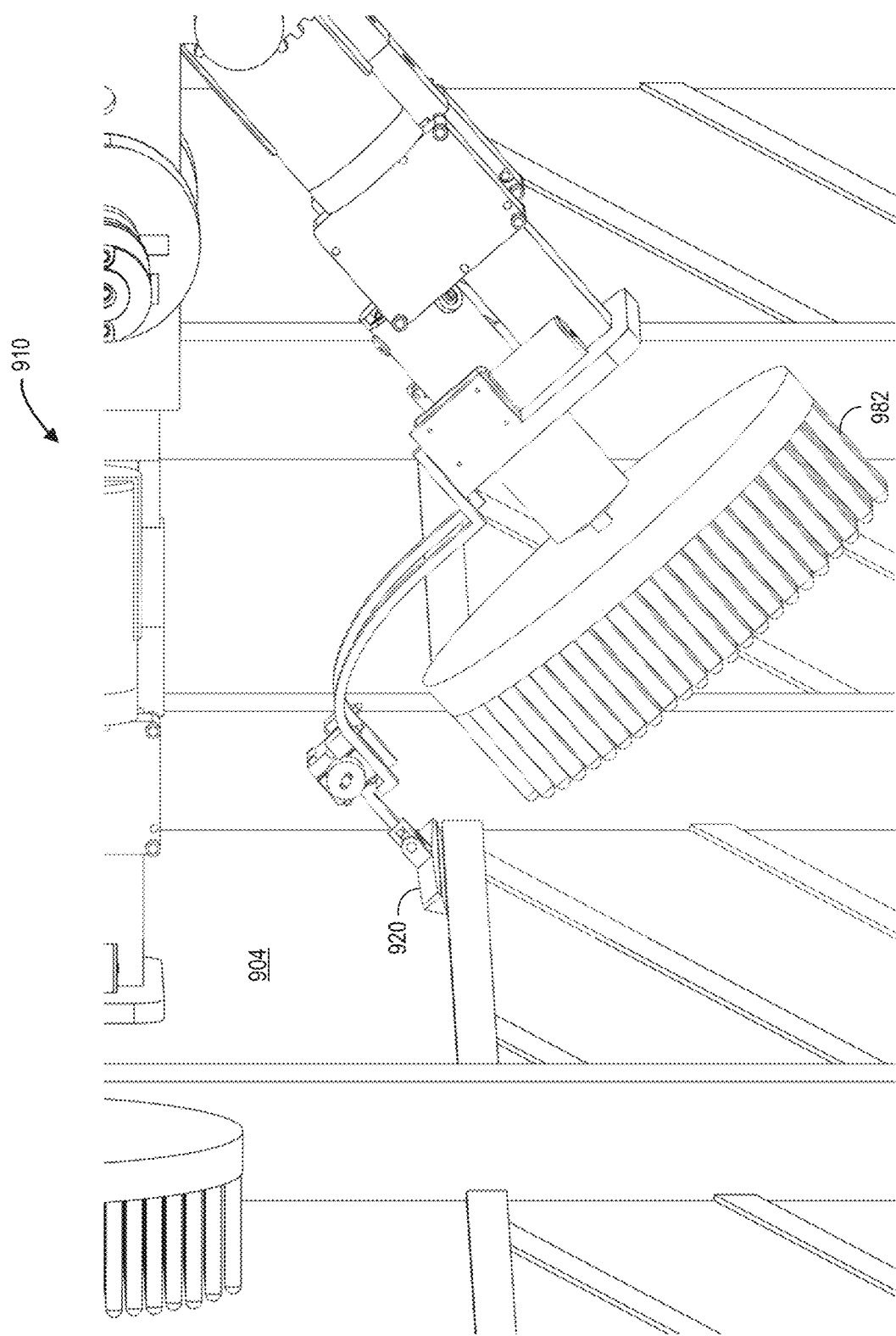

FIGS. 9A through 9G illustrate wiper blade engagement according to some embodiments. In particular, FIG. 9A is a side view 900 of a cleaning head with bristles 982 attached to a robotic arm 950. In this view 900, a wiper blade 920 is "disengaged" (that is, it is retracted and pulled away from a window being cleaned). FIG. 9B is a three-dimensional perspective view 902 of such an apparatus. FIGS. 9C and 9D are side and perspective views 904, 906, respectively, that show the wiper blade 920 moving into an "engaged" position (such that it contacts the window being cleaned). FIGS. 9E and 9F are perspective and side views 908, 909, respectively, that show the wiper blade 920 completely in the engaged position and in contact with the surface 904 being treated. Moreover, the treating portion 980 and bristles 982 have been moved (rotated down) and are not in contact with the surface. As can be seen in FIGS. 9A through 9G, distinct contact and separation of the wiper may allow for a cleaning action similar to human practices. Wiper disengagement may be sufficient to allow the cleaning surface a full range of motion. Inversely, the head may rotate sufficiently to allow wiping across the full range of the surface being treated. FIG. 9G is a perspective view 910 showing an engaged wiper blade 920 being used to wipe a corner area of a surface's 904 window.

Figure 10A:
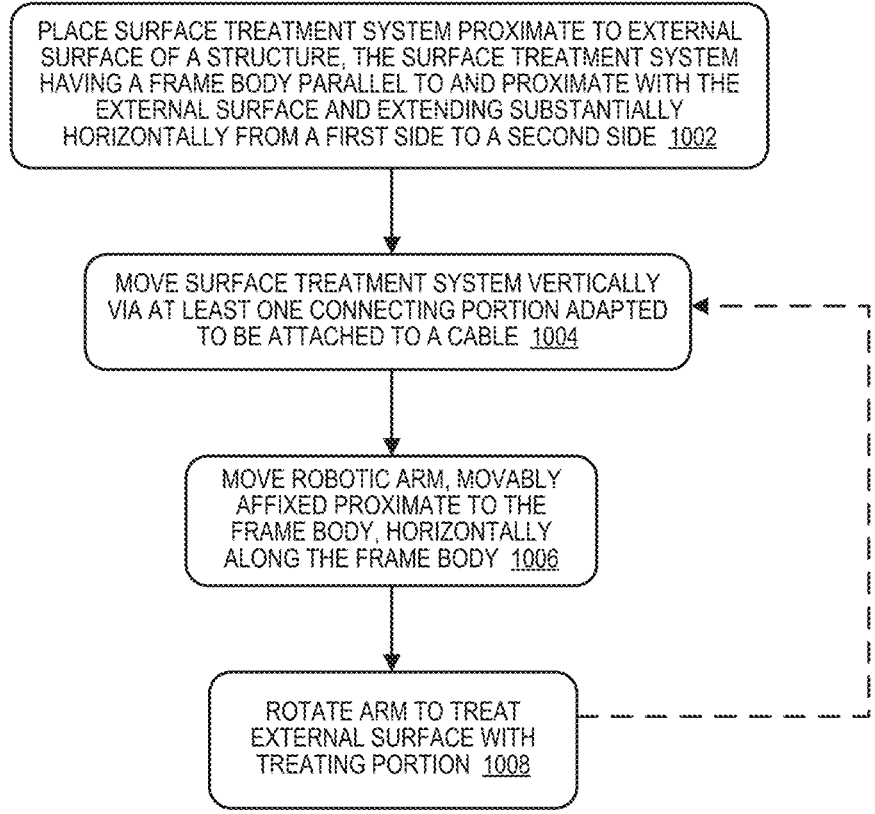
FIG. 10A is a surface treatment method in accordance with some embodiments.

In this way, the system may treat a surface in an efficient manner at least at par with current industry standards. For example, FIG. 10A illustrates a method that might be performed by some or all of the elements of the system 100 described herein in connection with FIGS. 1A and 1B according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 1002, a surface treatment system may be placed proximate to the external surface, the surface treatment system having a frame body parallel to and proximate with the external surface and extending substantially horizontally from a first side to a second side. At 1004, the surface treatment system may be moved vertically via at least one connecting portion adapted to be attached to a cable. At 1006, a robotic arm, movably affixed proximate to the frame body, is moved horizontally along the frame body. At 1008, the external surface may be treated with a treating portion attached to the robotic arm at an end proximate with the external surface. According to some embodiments, this is performed by rotating the robotic arm to vertically move the treating portion during treatment of the external surface. Moreover, the treating portion may be separately rotated to remain substantially parallel to and proximate with the external surface during rotation of the robotic arm. The process may then be repeated at 1004 as illustrated by the dashed arrow in FIG. 10A.

Figure 10B:
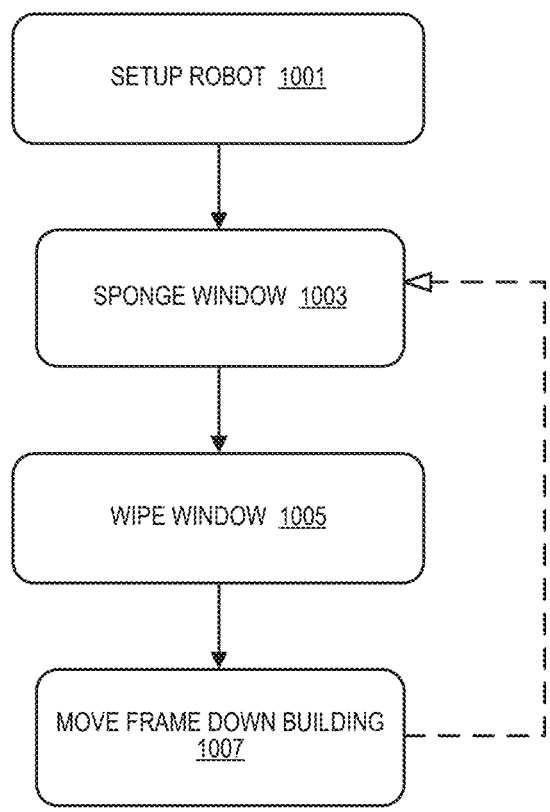
FIG. 10B is a window cleaning method in accordance with some embodiments.

FIG. 10B is a window cleaning method in accordance with some embodiments. At 1001, an operator may setup the robot. This may involve, for example, moving the robot modules into place and assembling them. The robot may then be positioned such that the robot is an arm's length below the top-most window. The operator may then arrange to sponge the window at 1003. For example, with the wiper disengaged, the operator may swing the arm upwards. The arm may then be moved laterally and swung downwards to apply a cleaning solution to the window. This may be repeated until the whole window is sponged (note that the corners may be revisited and individually cleaned). The operator may then arrange to wipe the window at 1005. For example, with the wiper engaged, the operator may wipe downwards (while the sponge is not in contact with the window or spinning) to remove the cleaning solution. The arm may then be moved laterally and be repositioned at the top of the window. At this point the operator may wipe downwards again and repeat the wiping steps until the whole window is wiped (and, again, the corners may be individually wiped). At 1007, the robot frame may be moved down the building. The sponging 1003 and wiping 1005 steps may then be repeated for the entire face of the building as illustrated by the dashed arrow in FIG. 10B.

Figure 11:
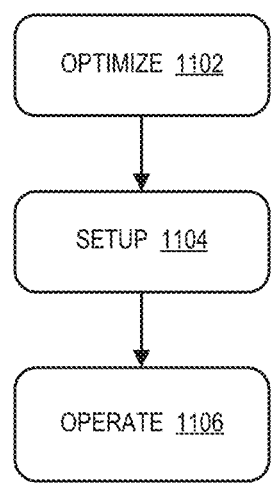
FIG. 11 is an operational method according to some embodiments.

FIG. 11 is an operational method according to some embodiments. At 1102, the system may optimize robot parameters per a given building (that is, many different parameters can be varied easily per building). For example, an overall frame length may be selected, a maximum number of frame modules to optimize horizontal spread may be selected, etc. An operator might also select a buffer spread (e.g., to determine an optimal distance from the building), a sponge size and shape (e.g., a maximum possible size to optimize speed), arm length (e.g., a maximum possible length to optimize reach), a wiper length (the wiper should be nominally longer than the sponge size), etc. In some embodiments, the operator might also specify which cleaning agents are being used.

At 1004, the operator may set up the robot. For example, modules may be transported (and each individual piece can be lifted by at most two people). Note that such a robot might be mounted on the ground or roof. The operator may also assemble frame by bolting frame modules together, add a rail car to the frame (e.g., by sliding it into rail), and attach the arm to the railcar. The operator may then attach the buffer and end caps, connect electricity and communication cables, and fill tanks with one or more appropriate treatment solutions.

At 1106, the operator may operate the surface treating system. For example, the operator may send the robot to an initial altitude (e.g., an arm's length below the topmost window). The arm then swings upward with the wiper retracted and the cleaning sponge is spinning in contact with the window (this may be achieved with six motors running simultaneously). The wiper arm may then extend forward and the arm swings downward with the wiper in place (and sponge out of contact and not spinning) to remove liquid from the window. Note that the railcar (and entire arm) moves horizontally to clean the window. These steps may be repeated as needed for the entire frame's horizontal length, after which the entire robot frame descends by an arm's length. The entire process may be repeated until the entire surface is cleaned. Depending on the characteristics and features of a surface, embodiments might instead clean one window completely before moving on to clean another window.

Instead of sponging and then wiping, and then sponging and wiping again vertical strips of windows, the robotic arm might sponge an entire window and then wipe that window. For example, the operator may send the robot to an initial altitude (e.g., an arm's length below the topmost window). The arm then swings upward with the wiper retracted and the cleaning sponge spinning while in contact with the window (this may be achieved, for example, with six motors running simultaneously). The operator will then move the sponge laterally and vertically to sponge the entire surface of the windows in semi-random zigzag pattern. The operator may also revisit window corners to ensure optimal coverage. The operator can then position the arm at a top corner of the window with the wiper arm extended forward and the sponge no longer spinning. The arm then swings downward with the wiper in place (and the sponge out of contact with the window) to remove liquid and dirt from the surface. Note that the railcar (and entire arm) can move horizontally to repeat this wiping motion for the entire window. These steps may be repeated as needed for the entire frame's horizontal length, after which the entire robot frame can descend by an arm's length. The entire process may be repeated until the entire surface is cleaned.

Note that a human operator may have remote control over all of the robot's functions. Some instructions may be recorded to largely automate the process. Moreover, images of the building face may be recorded while the robot descend for inspection purposes. Note that some or all of the robot's motors may have mechanical locks to prevent damage in the case of a loss of power and/or communication. In some embodiments, limited voltage may limit their maximum possible force to below a window's tolerance. When power is lost or a mechanical failure occurs, the robot may simply not move and be perfectly safe to bring to the ground or roof. In some embodiments, load cells may be located across the robot as an electronic safety check and to help ensure that appropriate force is applied during cleaning or other treatment. Moreover, speeds may be digitally and mechanically limited and the robot may operate at a relatively low voltage (e.g., 24 volts). Moreover, in some embodiments the only flammable element is associated with the treating portion. In some embodiments, communications are hardwired. In some cases, wireless communication abilities may be employed. If communications are lost, the robot may simply lock and not move (again being safe to return to the ground or roof). Moreover, portions of the robot may be formed of metal or rubber (and, as a result, nothing may be able to catch on fire).

In some embodiment, multiple robotic arms may be movably affixed proximate to the bottom of the frame body and move horizontally along the frame body during treatment of the external surface. In this case, at least one distance sensor may be employed to prevent collision between robotic arms. Similarly, mechanical absorbers may be installed between the robotic arms and/or at each end of the frame body to avoid damage.

In some embodiments, movement of the robotic arm is controlled by at least one rotary motor and communication with a remote computer. The movement may be controlled, for example, by a human operator via a user interface. Moreover, information associated with the robotic arm, from at least one of several types of cameras (e.g., optical and thermal), may be transmitted to the remote computer in substantially real-time to guide the human operator. In some cases, information from at least one sensor, adapted to evaluate cleanliness, is transmitted to the remote computer. In some embodiments, communication is further associated with previously recorded movement commands associated with the external surface and/or computer-assisted (e.g., Artificial Intelligence ("AI")) techniques may be employed (to guide or replace a human operator).

Figure 12:
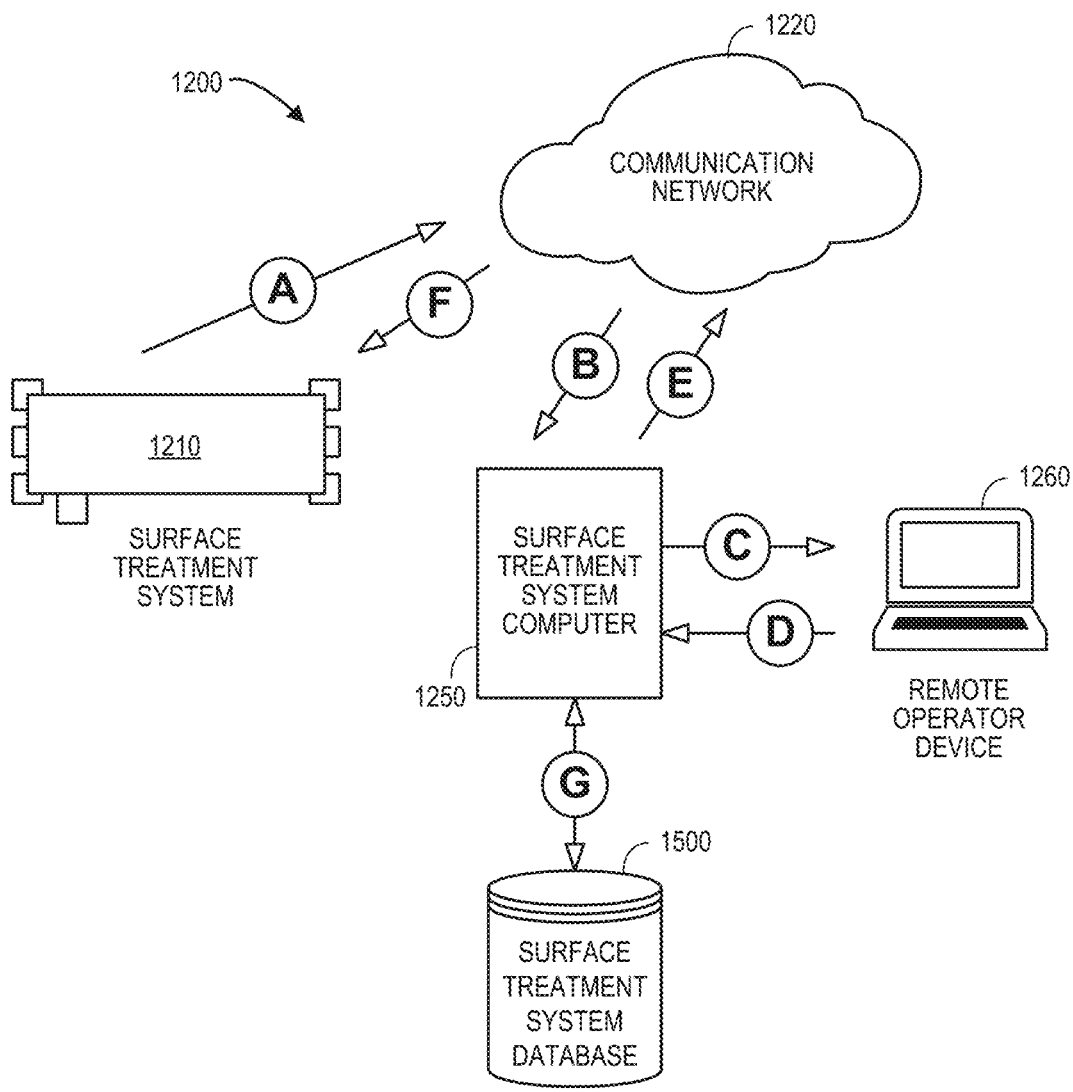
FIG. 12 is a surface treatment communication system in accordance with some embodiments.

FIG. 12 is block diagram of a system 1200 according to some embodiments of the present invention. A surface treatment system 1210 may exchange information with a surface treatment system computer 1250 via a communication network 1220. Some or all of the processes described herein might be performed automatically or be initiated via a command from a remote operator device 1260. As used herein, the term "automatically" may refer to, for example, actions that can be performed with little or no human intervention.

As used herein, devices, including those associated with the system 1200 and any other device described herein, may exchange information via any communication network which may be one or more of a hard-wired network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The surface treatment system computer 1250 may store information into and/or retrieve information from various data stores (e.g., the surface treatment database 1500), which may be locally stored or reside remote from the surface treatment system computer 1250. Although a single surface treatment system computer 1250 is shown in FIG. 12, any number of such devices may be included. Moreover, various devices described herein might be combined according to embodiments of the present invention. For example, in some embodiments, the surface treatment system computer 1250 and surface treatment database 1500 might comprise a single apparatus. Any of the system 1200 functions may be performed by a constellation of networked apparatuses, such as in a distributed processing or cloud-based architecture.

A user or administrator may access the system 1200 via the remote operator device 1260 (e.g., a Personal Computer ("PC"), tablet, or smartphone) to view information about, apply treatment, and/or manage operational information in accordance with any of the embodiments described herein. In some cases, an interactive graphical user interface display may let an operator or administrator define and/or adjust certain parameters (e.g., to define building parameters) and/or provide or receive automatically generated recommendations or results from the system 1200.

Figure 13:
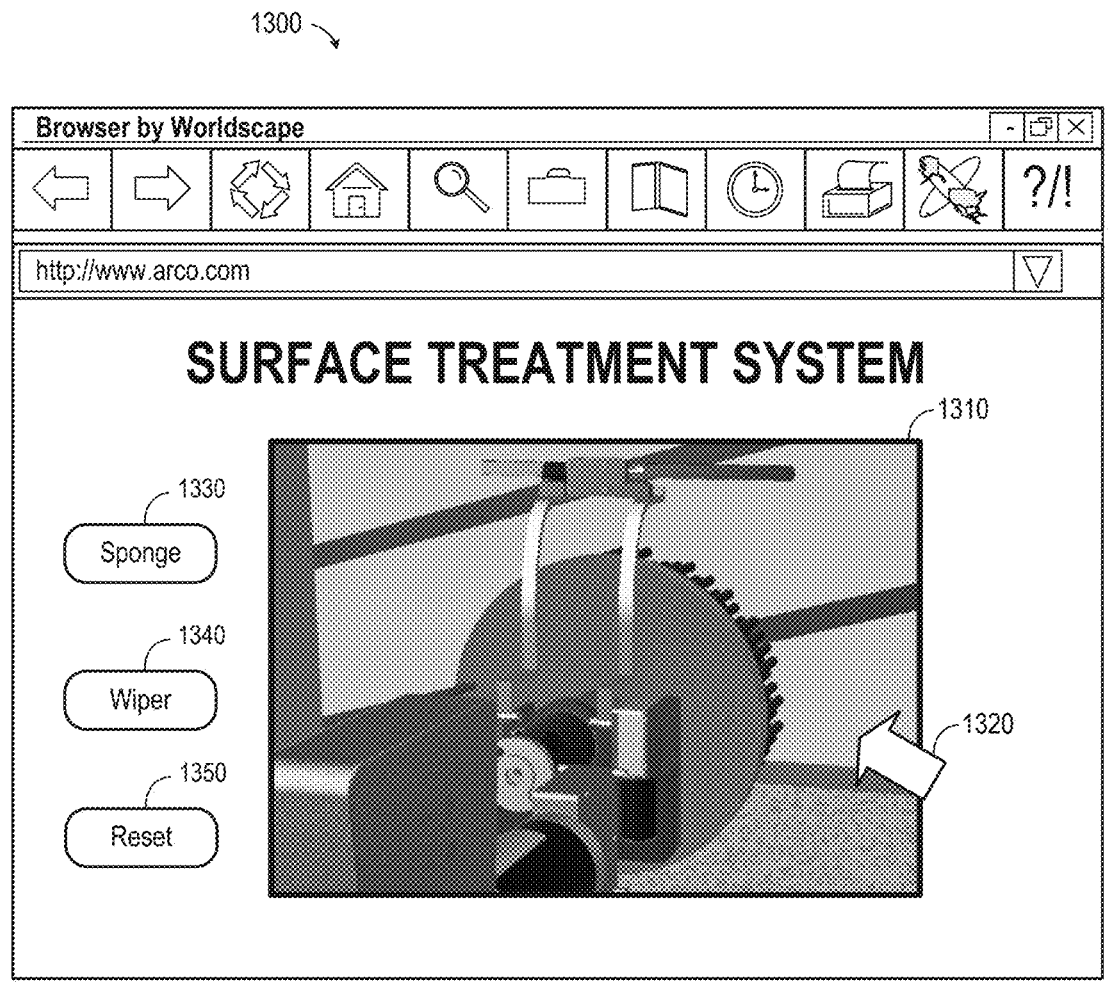
FIG. 13 is a surface treatment operator display according to some embodiments.

According to some embodiments, an administrator or operator interface may display various Graphical User Interface ("GUI") elements. For example, FIG. 13 illustrates a surface treatment system GUI display 1300 in accordance with some embodiments of the present invention. The display 1300 may include a graphical representation 1310 of an image captured by a camera in substantially real time. According to some embodiments, an administrator or operator may then select an element (e.g., via a touchscreen or computer mouse pointer 1320) to see more information about that element adjust movement of the system. Selection of an "Sponge" icon 1330, "Wiper" icon 1340, or "Reset" icon 1350 may also allow for alteration of the system's operation.

Figure 14:
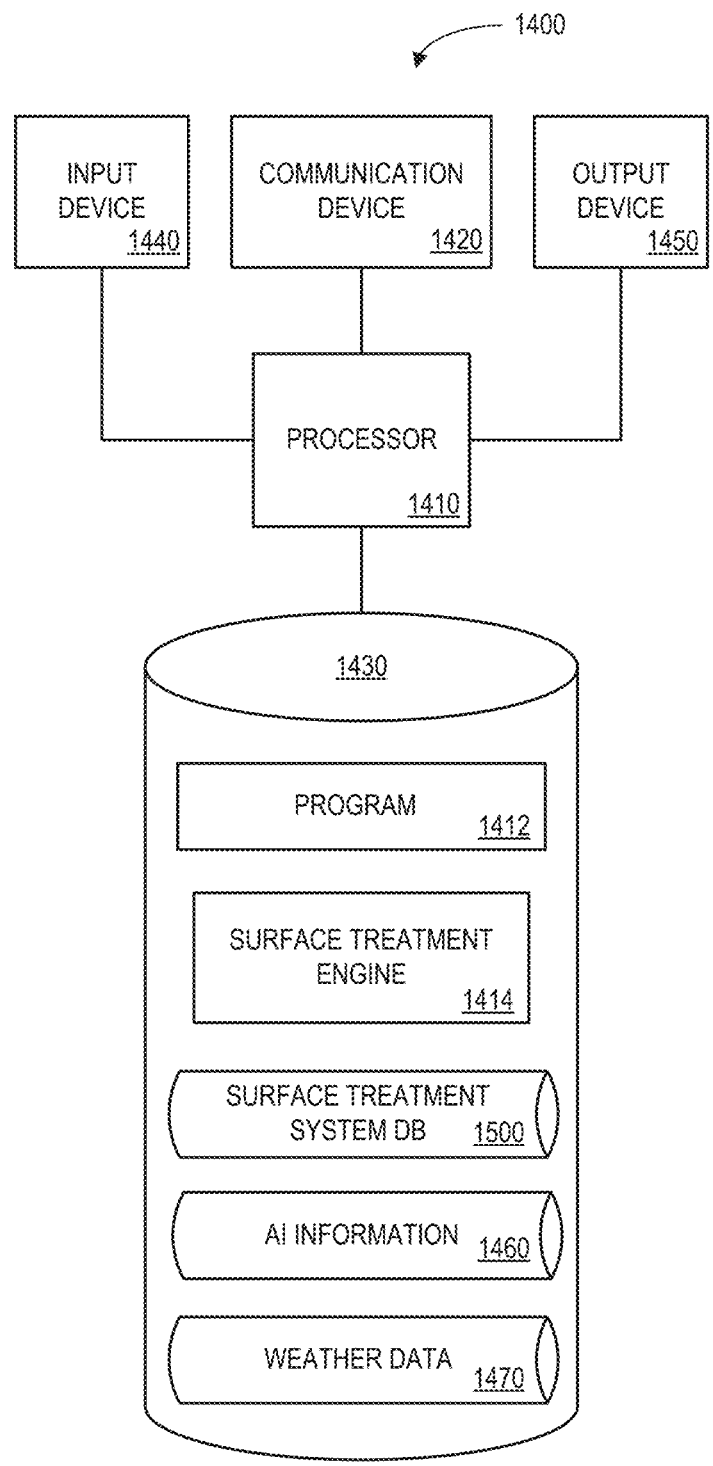
FIG. 14 is a surface treatment platform or apparatus in accordance with some embodiments.

The embodiments described herein may be implemented using any number of different hardware configurations. For example, FIG. 14 illustrates a platform or apparatus 1400 that may be, for example, associated with the system 1200 of FIG. 12 as well as the other systems described herein. The apparatus 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more surface treatment systems. The apparatus 1400 further includes an input device 1440 (e.g., a mouse and/or keyboard to define building parameters) and an output device 1450 (e.g., a computer monitor to display reports and treatment results to an administrator).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a surface treatment engine 1414 for controlling the processor 1410. The processor 1410 performs instructions of the programs 1412, 1414, and thereby operates in accordance with any of the embodiments described herein. For example, the processor 1410 may verify that a surface treatment system is proximate to an external surface, the surface treatment system having a frame body parallel to and proximate with the external surface and extending substantially horizontally from a first side to a second side. The processor 1410 may then move the surface treatment system vertically via at least one connecting portion adapted to be attached to a cable. The processor 1410 may also move a robotic arm, movably affixed proximate to the frame body, horizontally along the frame body and treat the external surface with a treating portion attached to the robotic arm at an end proximate with the external surface.

The programs 1412, 1414 may be stored in a compressed, uncompiled and/or encrypted format. The programs 1412, 1414 may furthermore include other program elements, such as an operating system, a database management system, and/or device drivers used by the processor 1410 to interface with peripheral devices.

As used herein, information may be "received" by or "transmitted" to, for example: (i) the apparatus 1400 from another device; or (ii) a software application or module within the apparatus 1400 from another software application, module, or any other source.

In some embodiments (such as shown in FIG. 14), the storage device 1430 further stores a surface treatment system database 1500, AI information 1460, and weather data 1470. An example of a database that may be used in connection with the apparatus 1400 will now be described in detail with respect to FIG. 15. Note that the database described herein is only one example, and additional and/or different information may be stored therein. Moreover, various databases might be split or combined in accordance with any of the embodiments described herein.

Referring to FIG. 15, a table is shown that represents the surface treatment system database 1500 that may be stored at the apparatus 1400 according to some embodiments. The table may include, for example, entries identifying surfaces that have been cleaned or otherwise treated. The table may also define fields 1502, 1504, 1506, 1508, 1510 for each of the entries. The fields 1502, 1504, 1506, 1508, 1510 may, according to some embodiments, specify: a surface treatment system identifier 1502, a building identifier 1504, a date and time 1506, an operator identifier 1508, and recorded movements 1510. The surface treatment system database 1500 may be created and updated, for example, based on information received from an operator or administrator (e.g., when a new building is cleaned).

The surface treatment system identifier 1502 may be, for example, a unique alphanumeric code associated with a particular robot. The building identifier 1504 and a date/time 1506 reflect when the windows were cleaned and the operator identifier 1508 indicates who was controlling the robot during cleaning. The recorded movements 1510 can be used to review what happened (e.g., if something goes wrong) and/or to help the operator (or a new operator) during a subsequent cleaning of the same surface.

Thus, embodiments may develop and deploy robots that clean the exterior surfaces of high-rise buildings and apply time-tested methods and components in a novel robotics package. The approach may achieve superlative safety and efficiency and deliver capabilities beyond cleaning (e.g., polishing, painting, etc.). The wider, adjustable span of the robot grants maximum reach and the robust design permits rapid lateral movement and descent. Embodiments may implement industry exceeding mechanical safety devices alongside computer-aided digital fail-safes. In some embodiments, integrated weatherproofing and aerodynamics let the robot operate during more extreme conditions, in the dark, etc. Moreover, components can readily be swapped, allowing for a wider range of service offerings. Embodiments may be fast, providing multiple descents per day, quicker descent and lateral movement, greater reach and range, etc. Embodiments will provide a safe environment by reducing human error, providing mechanical and digital fail-safes, tolerating harsher winds, rain, and cold, etc.

Although specific hardware and data configurations have been described herein, note that any number of other configurations may be provided in accordance with embodiments of the present invention (e.g., in other types of environments). Moreover, although some embodiments are focused on particular treatments, any of the embodiments described herein could be applied to other types of surface treatments (e.g., by altering the treating portion).

Figure 16:
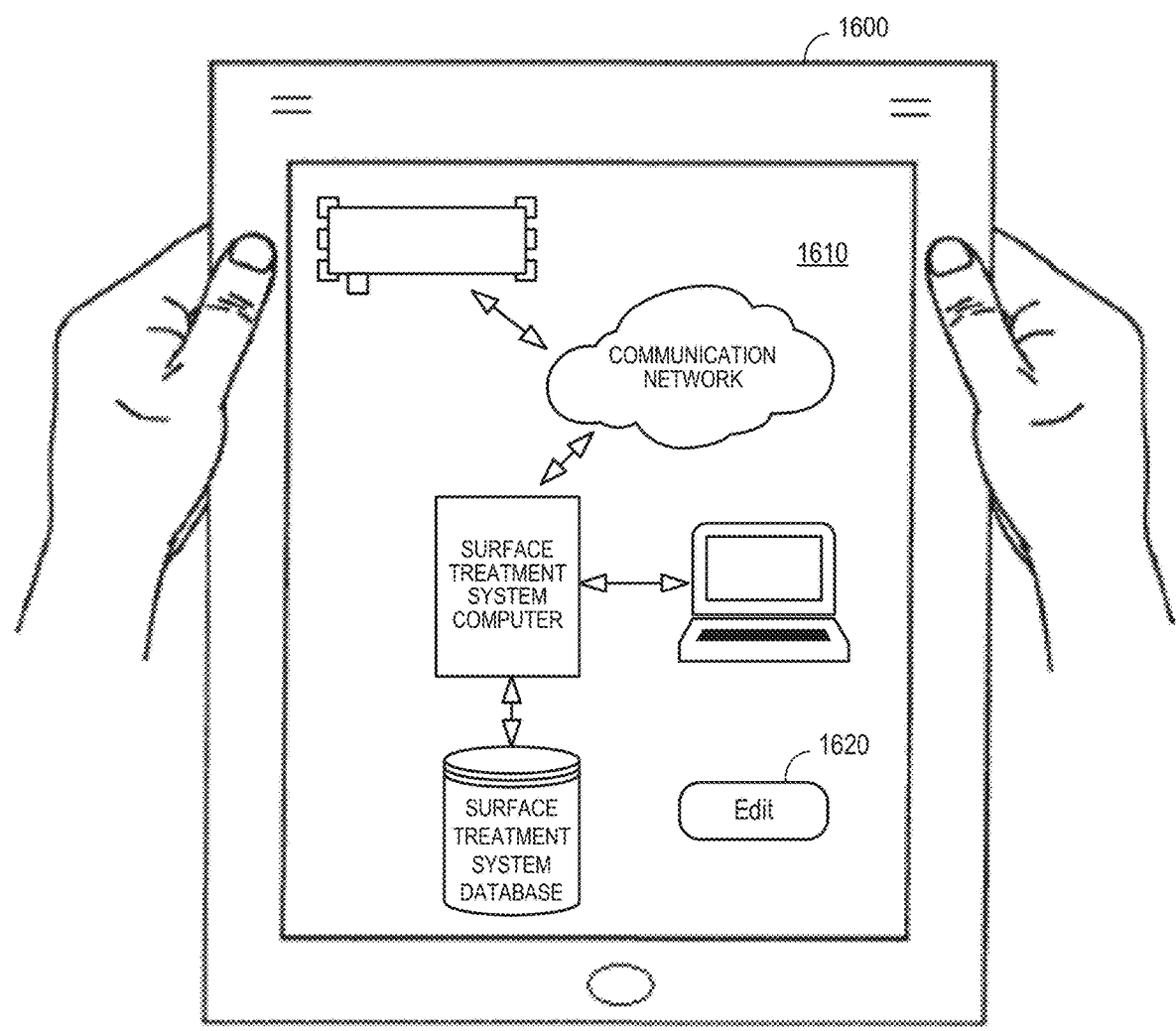
FIG. 16 is a computer tablet in accordance with some embodiments.

FIG. 16 illustrates a wireless or tabular device 1600 displaying elements of a system in accordance with some embodiments of the present invention. For example, in some embodiments, the device 1600 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly or hardwired with a remote entity. The device 1600 presents a display 1610 that may be used to display information about a surface treatment system. For example, the elements may be selected by an operator (e.g., via a touchscreen interface of the device 1600) to view more information about that element and/or to adjust settings or parameters associated with that element (e.g., to introduce a new building into the system).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to treat a substantially vertical external surface of a structure, comprising:
 a frame body to be positioned parallel to and proximate with the external surface and extend substantially horizontally from a first side to a second side;
 at least one connecting portion adapted to be attached to a cable to provide for vertical movement of the frame body;

a wheeled carriage within a horizontal recess of the frame body, the wheeled carriage being able to roll within the recess to move horizontally along the frame body during treatment of the external surface;

a robotic arm affixed to and extending from the wheeled carriage to an end proximate with the external surface; and a treating portion attached to the robotic arm near the end proximate with the external surface, wherein the robotic arm is adapted to rotate, vertically moving the treating portion during treatment of the external surface, and further wherein the treating portion is separately rotated to remain substantially parallel to and proximate with the external surface during rotation of the robotic arm.

2. The system of claim 1, wherein the horizontal recess is proximate to a bottom of the frame body.

3. The system of claim 1, further comprising:
a first set of buffer portions located proximate the first side to move vertically on the external surface; and
a second set of buffer portions located proximate the second side to move vertically on the external surface,
wherein the first and second sets of buffer portions absorb and distribute impulse via mechanical dampeners and materials.

4. The system of claim 1, wherein the treating portion is associated with at least one of: (i) a sponge, (ii) a brush, (iii) a spinning element, (iv) a vibrating element, (v) a spiral-shaped portion, and (vi) a replaceable portion.

5. The system of claim 1, wherein the treating portion is a removable module attached to the robotic arm near the end proximate with the external surface and further comprises:
flexible bristles, and
a movable, retractable wiper assembly with a plurality of parallel wiper blades.

6. The system of claim 1, wherein the treatment is associated with at least one of: (i) cleaning, (ii) polishing, (iii) painting, (iv) resurfacing, and (v) pressure washing.

7. The system of claim 6, wherein the treating portion is adapted to apply one or more substances onto the vertical surface during treatment.

8. The system of claim 7, wherein the substance is associated with at least one of: (i) a liquid, (ii) water, (iii) a cleaning agent, (iv) soap, (v) steam, (vi) an abrasive material, (vii) an antifreeze solution, (viii) paint, (ix) persistent and transient surface finishing solutions, and (x) another surface treatment solution.

9. The system of claim 1, wherein the structure is associated with at least one of: (i) a building, (ii) a multi-story building, (iii) a skyscraper, (iv) an office building, (v) a warehouse, (vi) a stadium, (vii) a wall, (viii) a bridge, (ix) a monument, (x) a dam, (xi) an apartment building, (xii) an airport structure, and (xiii) a man-made structure with at least 10,000 square feet of exterior surfaces.

10. The system of claim 1, wherein the substantially vertical surface is associated with at least one of: (i) a wall, (ii) a window, (iii) brick, (iv) stone, (v) steel, (vi) concrete, (vii) cement, (viii) iron and alloys, (ix) terracotta, and (x) metal.

11. The system of claim 1, wherein movement of the robotic arm is controlled by at least one rotary motor and communication with a remote computer.

12. The system of claim 11, wherein the movement is controlled by a human operator via a user interface.

13. The system of claim 12, wherein information associated with the robotic arm, from at least one camera, is transmitted to the remote computer in substantially real-time to guide the human operator.

14. The system of claim 13, wherein information from at least one sensor, adapted to evaluate cleanliness, is transmitted to the remote computer.

15. The system of claim 11, wherein the remote computer generates communication to control movement of the robotic arm in accordance with at least one of: (i) previously recorded movement commands associated with the external surface, and (ii) artificial intelligence.

16. The system of claim 1, wherein a plurality of robotic arms are each affixed to a wheeled carriage able to roll horizontally along the frame body during treatment of the external surface, further comprising:
at least one distance sensor to prevent collision between robotic arms; and
a mechanical absorber between each of the robotic arms.

17. The system of claim 1, wherein at least one force sensor at the treating portion limits maximum applied torque to prevent damage.

18. The system of claim 1, wherein the frame body is modular such that the frame body can be transported more easily.

19. The system of claim 1, further comprising:
a plurality of liquid storage tanks to store different treating agents.

20. The system of claim 19, wherein the treating agents flow from the liquid storage tanks to the treating portion during treatment.

21. The system of claim 1, wherein movement of the robotic arm is associated with at least one self-locking motor that does not move in the event of a failure.

22. The system of claim 1, wherein the robotic arm rotates using a single-axis joint to vertically move the treating portion during treatment of the external surface.

23. The system of claim 22, wherein the robotic arm has a series of slots that work with a gear to facilitate movement of the robotic arm.

* * * * *